(12) United States Patent
Fujita et al.

(10) Patent No.: US 7,433,991 B2
(45) Date of Patent: Oct. 7, 2008

(54) SELECTOR, SELECTION METHOD, AND PROGRAM PRODUCT

(75) Inventors: Kenichi Fujita, Shinagawa (JP);
Masanobu Hayama, Shinagawa (JP);
Katsuji Ideura, Shinagawa (JP);
Kazuhiro Yasuno, Shinagawa (JP);
Masayuki Kuribayashi, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 141 days.

(21) Appl. No.: 11/260,294

(22) Filed: Oct. 28, 2005

(65) Prior Publication Data

US 2006/0095644 A1 May 4, 2006

(30) Foreign Application Priority Data

Oct. 29, 2004 (JP) ............................. 2004-316319

(51) Int. Cl.
*G06F 13/20* (2006.01)
*G06F 13/00* (2006.01)
*G06F 13/40* (2006.01)

(52) U.S. Cl. ...................................... 710/316; 710/313
(58) Field of Classification Search ................. 710/313, 710/316
See application file for complete search history.

(56) References Cited

U.S. PATENT DOCUMENTS 6,622,195 B2 * 9/2003 Osakada et al. ............. 710/316
6,708,231 B1 * 3/2004 Kitagawa ....................... 710/10
6,934,793 B2 * 8/2005 Ying et al. ................... 710/316
2003/0110328 A1 * 6/2003 Seki et al. ....................... 710/36
2003/0131127 A1 * 7/2003 King et al. .................. 709/238
2003/0191878 A1 * 10/2003 Shirley ......................... 710/100
2003/0222801 A1 * 12/2003 Ying et al. ..................... 341/26
2003/0226137 A1 * 12/2003 Nagao .......................... 717/168
2004/0075638 A1 * 4/2004 Han ............................ 345/156
2005/0273312 A1 * 12/2005 Sandulescu et al. ........... 703/25

FOREIGN PATENT DOCUMENTS

| EP | 0860771 | 8/1998 |
|---|---|---|
| JP | 2000-353145 | 12/2000 |
| JP | 2001-43178 | 2/2001 |
| JP | 3194082 | 6/2001 |

OTHER PUBLICATIONS

Compaq et al.; "Universal Serial Bus Specification"; Apr. 27, 2000; Revision 2.0; pp. 264-265 and 275-437.*

* cited by examiner

*Primary Examiner*—Paul R. Myers
*Assistant Examiner*—Ryan M Stiglic
(74) *Attorney, Agent, or Firm*—Staas & Halsey LLP

(57) ABSTRACT

A selector that selectively makes connections between USB devices attached to a console side thereof and electronics devices connected to a host side thereof. The selector includes a USB host circuit controlling the USB devices, and USB device emulation circuits being respectively provided for the electronics devices and maintaining the connections with the electronics devices even while the USB devices are selectively being changed, and a control circuit coupling the USB host circuit and USB device emulation circuits.

22 Claims, 23 Drawing Sheets

US 7,433,991 B2

SELECTOR, SELECTION METHOD, AND PROGRAM PRODUCT

BACKGROUND OF THE INVENTION

1. Field of the Invention

This invention generally relates to selectors, selection methods, and program products that enable sharing of input/output devices by selectively changing a connection between a selector and multiple computers.

2. Description of the Related Art

These days, USB (Universal Serial Bus) becomes the mainstream computer peripheral interface of the input/output devices such as keyboard, mouse, or the like to be connected to a server or PC (Personal Computers). The USB is so widely available that the keyboard or mouse having another peripheral interface is becoming difficult to purchase.

Under the circumstances, there has been proposed the devices having the USB keyboard and USB mouse for selectively connecting one or more computers. The afore-mentioned devices function as selectors provided for sharing the input/output devices by selectively changing the connection between the selector and one or more computers, as described in Japanese Patent Application Publication No. 2001-43178 (hereinafter, referred to as Document 1) and Japanese Patent Application Publication No. 2000-353145 (hereinafter, referred to as Document 2).

Japanese Patent No. 3,194,082 (hereinafter, referred to as Document 3) has proposed the select operation circuit having the main control circuit and the select circuit, the main control circuit connecting a set of data input devices, the select circuit selectively transmitting input data input via the afore-mentioned set of data input devices to multiple computers.

The above-mentioned selectors to operate with USB, however, simply mechanically change USB signal lines in order to be coupled. In such configuration, attach/detach process has to be implemented whenever the USB signal line is selectively changed. Such process further produces load/unload process on a server, causing the burden to the server and leading to the generation of a wait time during the load/unload process on the server. In addition, depending on the load applied on the server or the system configuration, it will take time to load/unload the driver. Otherwise, a select operation will interrupt the unload process of the driver to implement the load process. Consequently, the system operates unstably or the system comes to a halt and cannot be controlled. Further, Document 3 does not disclose a selector corresponding to the USB devices.

SUMMARY OF THE INVENTION

The present invention has been made in view of the above circumstances and provides a selector, selection method, and program product that can selectively change devices without burdening a server.

According to one aspect of the present invention, preferably, there is provided a selector that selectively makes connections between USB devices attached to a console side thereof and electronics devices connected to a host side thereof, the selector including a USB host circuit controlling the USB devices; and USB device emulation circuits being respectively provided for the electronics devices and maintaining the connections with the electronics devices even while the USB devices are selectively being changed; and a control circuit coupling the USB host circuit and USB device emulation circuits.

According to another aspect of the present invention, preferably, there is provided a selector that selectively changes USB devices attached to a console side thereof and changes electronics devices connected to a host side thereof, the selector including controlling the USB devices; and maintaining the connections with the electronics devices even while the USB devices are selectively being changed; and coupling the USB host circuit and USB device emulation circuits.

According to still another aspect of the present invention, preferably, there is provided a program product that selectively changes USB devices attached to a console side thereof and changes electronics devices connected to a host side thereof, the selector including controlling the USB devices; and maintaining the connections with the electronics devices even while the USB devices are selectively being changed; and coupling the USB host circuit and USB device emulation circuits.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 1:
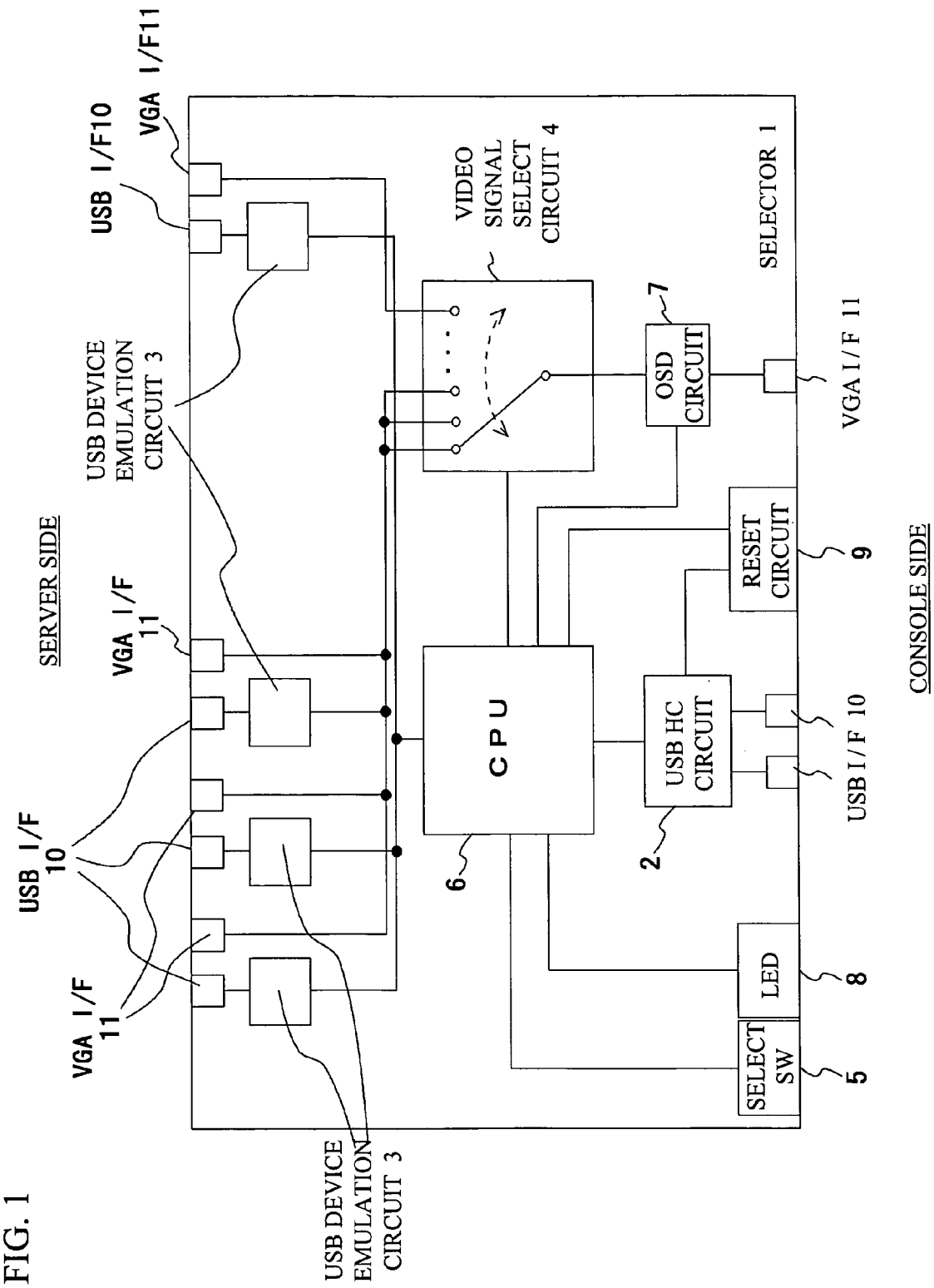
FIG. 1 is a block diagram of a configuration of a selector.

FIG. 1 shows a configuration of a selector 1 in accordance with the present embodiment of the present invention. Referring to FIG. 1, the selector 1 includes a USB host controller circuit (hereinafter, simply referred to as USB HC circuit) 2, a USB device emulation circuit 3, a video signal select circuit 4, a select switch (hereinafter, simply referred to as select SW) 5, a CPU 6, an OSD (On Screen Display) circuit 7, an LED 8, a reset circuit 9, a USB I/F 10, and a VGA (Video Graphics Array) I/F 11.

The USB HC circuit 2 is coupled to a USB keyboard 31 and a USB mouse 32, and implements an enumeration process on the USB devices. The enumeration process is a device identification process. Then, the USB HC circuit 2 extracts keyboard data (key data) and mouse data and converts the data into signals corresponding to PS/2 or UART (Universal Asynchronous Receiver Transmitter) to transmit to the CPU 6.

The USB device emulation circuit 3 is provided for each PC or server to be connected, so as to emulate the operation of the USB keyboard 31 or the USB mouse 32, receives the key data and mouse data from the CPU 6, and transmits the data to a server being connected. The USB device emulation circuit 3 being connected to a selected server (the server with which a connection is electrically established) outputs the data of keyboard or mouse to the selected server. The USB device emulation circuit 3 being connected to an unselected server outputs emulation signals, which are obtained by emulating the operation of the keyboard or the mouse, to the unselected server, and operates as if the keyboard or the mouse were coupled to the unselected server.

The video signal select circuit 4 selectively changes multiple video signals input from the PC or server. The select SW 5 selects the PC or server being connected to the selector 1.

The CPU 6 implements select control operations of the USB device emulation circuit 3, the video signal select circuit 4, and the select SW 5, and relays the key data and the mouse data to the USB device emulation circuit 3 being selected by the USB HC circuit 2.

The OSD circuit 7 performs the configuration of the selector 1 and displays the select control operations on the selector 1. The LED 8 indicates the selected PC or server. The reset circuit 9 resets the selector 1 and USB HC circuit 2.

Figure 2:
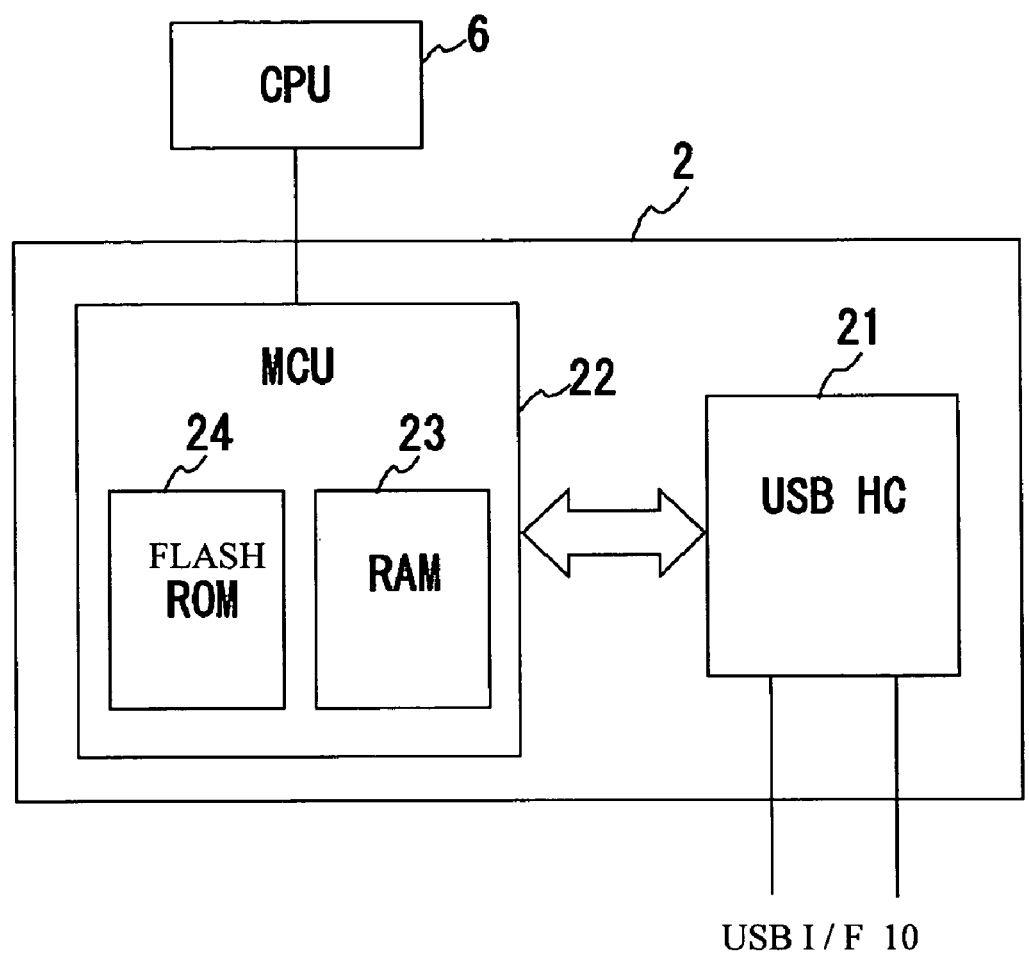
FIG. 2 is a block diagram of a configuration of a USB HC circuit.

Next, referring to FIG. 2, a description will be given of the USB HC circuit 2. The USB HC circuit 2 includes a USB host controller (USB HC) 21 and a MCU (Micro Controller Unit) 22. The USB HC 21 is connected to an external bus of the MCU 22. The MCU 22 is a standard type and is capable of either internally or externally coupling to a ROM and a RAM 23. ROM is, for example, a rewritable flash ROM 24. The USB HC 21 is, for example, ISP116x series (the product name of Philips) or SL811HS (the product name of Cypress). The USB HC circuit 2 may be composed of the MCU 22 and a USB transceiver.

As a configuration example of the USB device emulation circuit 3, the USB device may be emulated by an MCU. (This is not shown, because the USB device emulation circuit 3 shown in FIG. 1 is simply replaced by the MCU.) For reference, the MCU is a standard type and internally includes a ROM and RAM, and the ROM is, for example, a rewritable flash ROM.

The MCU 22 in the USB HC circuit 2, the MCU in the USB device emulation circuit 3, and the CPU 6 read a program from the memory storing the program, and implement the control operations according to the program and the procedure shown in a sequence or flowchart described below.

Figure 3:
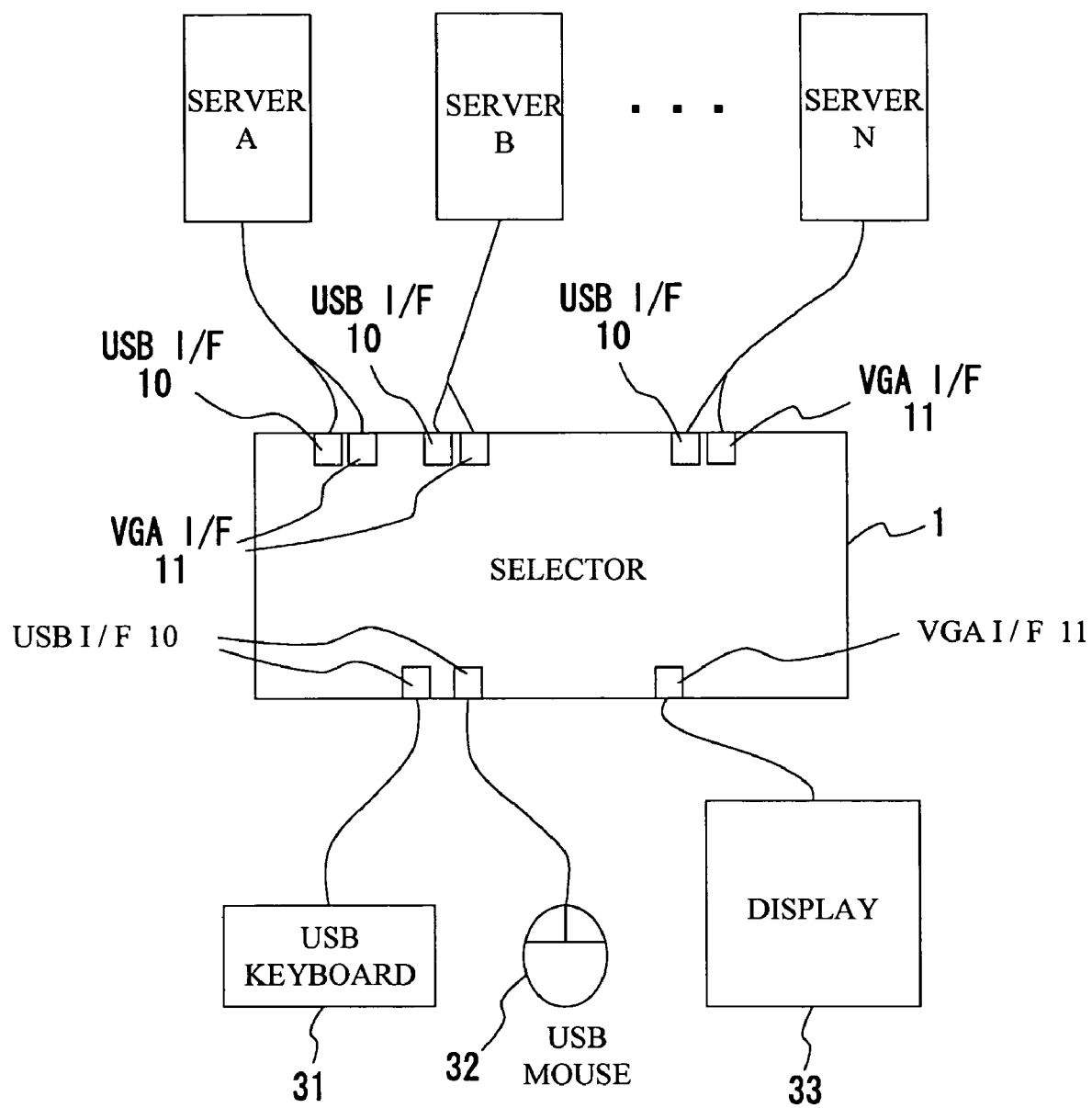
FIG. 3 is a connection diagram between the selector, multiple servers, and console devices.

FIG. 3 is a connection diagram between the selector 1 and servers, the USB keyboard 31, the USB mouse 32, and a display 33. The USBs and VGAs of the servers are connected to interfaces of the selector 1 on a server side of the selector 1 by cables. The cables may be provided for the USBs and VGAs respectively, or the cables for the USB and VGA may be bundled together into, for example, an RJ-45 cable (Registered Jack 45: 8-pin modular connector). Accordingly, the interfaces on the selector 1 are configured to have shapes corresponding to the cables (USB and VGA cables or RJ-45 cable). In FIG. 1 and FIG. 3, both USB and VGA interfaces are shown to facilitate better understanding of flows of the USB and VGA signals, whereas the USB and VGA cables are bundled together and shown as composite cables.

The display 33 is connected to the VGA interface (VGA I/F) 11 on a console side of the selector 1. The USB keyboard 31 and the USB mouse 32 are respectively attached to the USB interface (USB I/F) 10 provided on the console side of the selector 1. Moreover, The USB keyboard 31, the UBS mouse 32, and the display 33 coupled on the console side are coupled to the server to be selected by the selector 1.

Here, the signal flows in the selector described below. On the server side, when the server is connected to the selector 1, the USB device emulation circuit 3 is coupled to a USB host controller, not shown, of the server. Then, the enumeration process begins. The USB device emulation circuit 3 is configured to be a composite device having basic functions of the USB keyboard 31 and the USB mouse 32. Configure/configuration denotes settings of the functions of the device. In this manner, a communication path is established between the server and the USB device emulation circuit 3. Subsequently, the USB device emulation circuit 3 transmits the key data and mouse data received from the CPU 6 on the selector 1 to the server, receives information on LED indication or the like to transmit to the USB keyboard 31, and then transmits such information to the CPU 6 on the selector 1.

The VGA signal output from the server is transmitted to the video signal select circuit 4 via the VGA I/F 11 on the selector 1. The CPU 6 controls the video signal select circuit 4 and the VGA signal of the server selected by the select SW 5 is transmitted to the VGA I/F 11 on the on the console side.

On the other hand, on the console side of the selector 1, when the USB keyboard 31 is attached to the selector 1, the enumeration process begins between the USB HC circuit 2 and the USB keyboard 31. When the enumeration process completes, the USB HC circuit 2 transmits "Interrupt" to the USB keyboard 31 to request the USB keyboard 31 for the key data. The key data received from the USB keyboard 31 is transmitted to the CPU 6 of the selector 1. In this case, the PS/2 or serial (UART, IIC) interface is used. The USB HC circuit 2 converts the key data to correspond to the afore-mentioned interface and transmits the converted data. With respect to the USB mouse 32, the same process is implemented as in the USB keyboard 31.

The select SW 5 provides a mechanism that selectively changes the connection between the server connected to the selector 1 and the keyboard, mouse, and the display 33 provided on the console side. The CPU 6 detects the server selected by the select SW 5, and changes a transmission path for transmitting and receiving data and the video signals between the USB HC circuit 2 and the USB device emulation circuit 3 so that the selected server may be coupled to the console side. The LED 8 indicates the selected server.

The reset circuit 9 is coupled to reset terminals on the CPU 6 and on the MCU 22 in the USB HC circuit 2, and includes a reset switch to provide a reset mechanism. The reset circuit 9 will be described later in detail.

The OSD circuit 7 is provided between the video signal select circuit 4 and the VGA I/F 11 on the console side to superimpose the video signals of the video signal select circuit 4 and connection information, select information, or the like. When a port of the selector 1 not connected by a server is selected, a clock is separately supplied to the OSD circuit 7 to display the connection information, select information, or the like.

The selector 1 is configured to include the USB host controller circuit between the server and the USB devices such as keyboard, mouse, or hub, and the USB device is coupled to the USB controller circuit 2, in accordance with the first embodiment of the present invention. The USB HC circuit 2 is configured to operate all processes generated by attaching and detaching the USB device such as the enumeration process, so that the server needs not operate such processes. The USB HC circuit 2 maintains connection with the USB device even during the select operation period, unless the USB device is detached physically.

On the server side, the USB device emulation circuit 3 with the USB device capabilities always maintains connection with the servers, and does not generate the enumeration and detach processes even when the USB device is attached and detached. The CPU 6 controls and changes the destination of the data transmission in order to transmit the data from the USB device to the selected server and transmit the video signals from the server to transmit to the display 33 provided on the console side. This enables the servers to recognize that the keyboard and mouse are always connected. Therefore, it is possible to make a connection electrically without burdening the servers or attaching or detaching the USB device.

Figure 4:
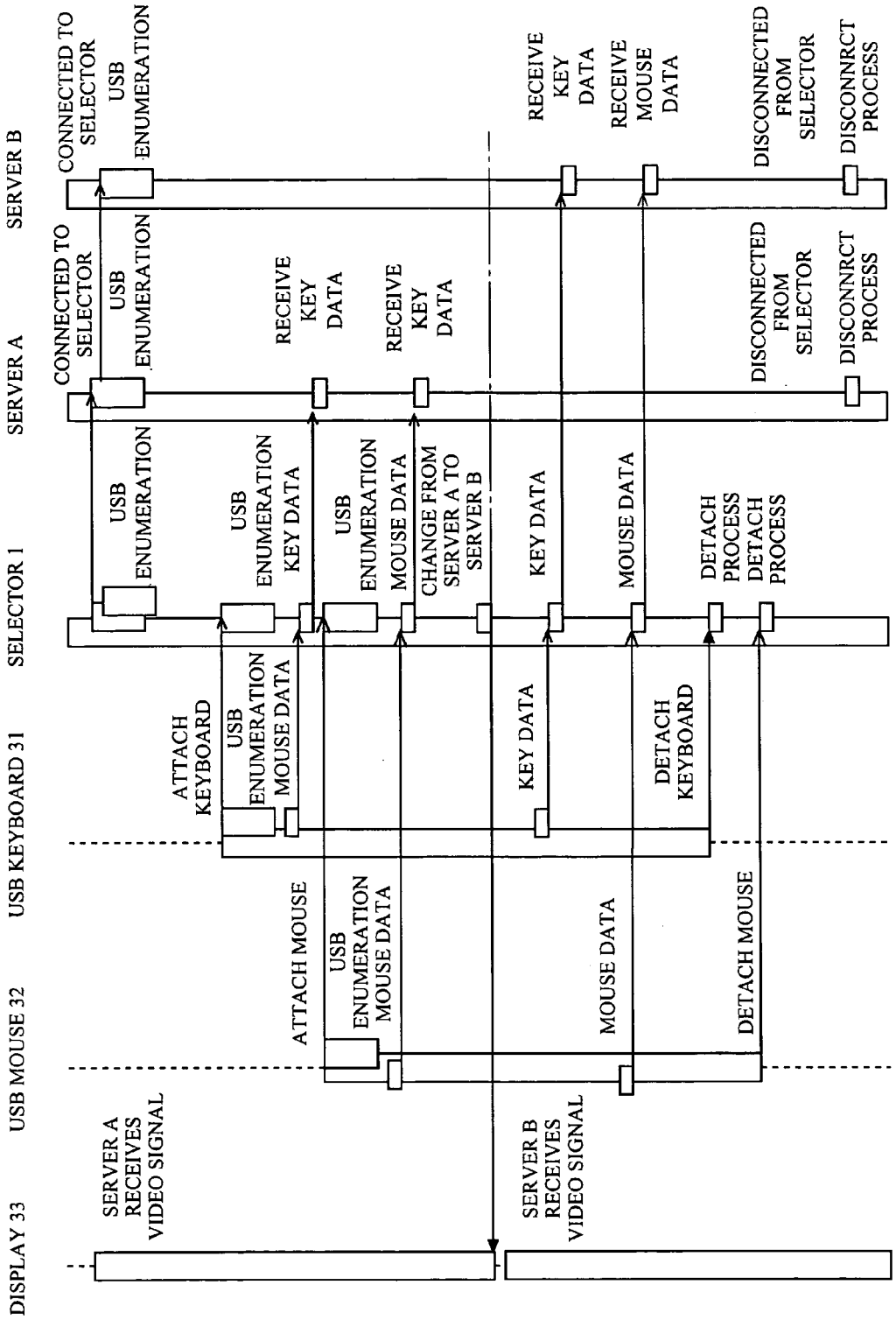
FIG. 4 is a signal sequence diagram between a server A and a server B and a selector 1, a USB keyboard 31 and a USB mouse 32 and the selector 1, and the selector 1 and peripheral devices when the selector 1 changes from the server A to the server B.
Figure 5:
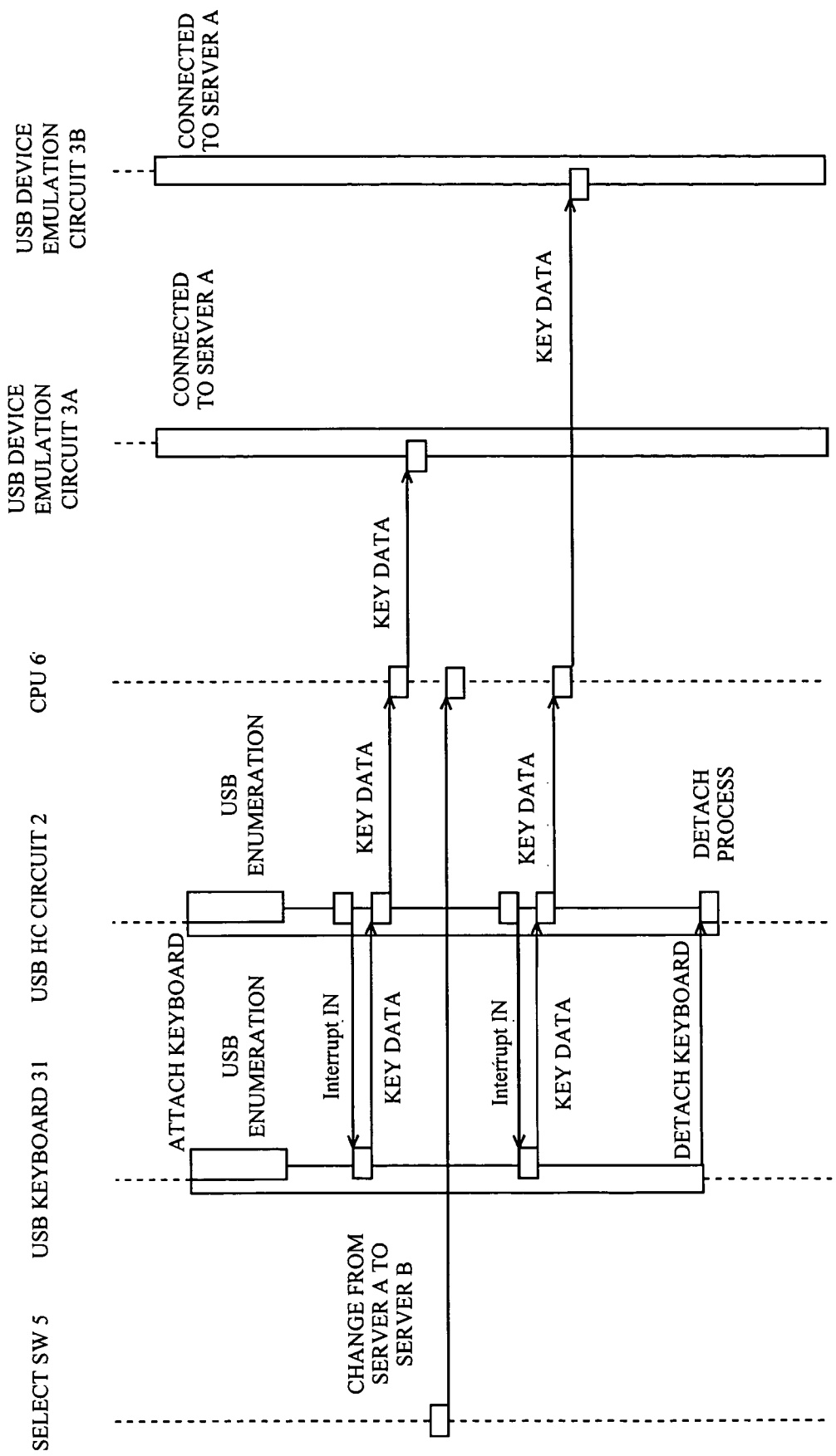
FIG. 5 is a signal sequence diagram between a select SW 5, a USB HC circuit 2, a CPU 6, a USB device emulation circuit 3A coupled to the server A, a USB device emulation circuit 3B coupled to the server B, the USB keyboard 31 attached to the selector 1.

Next, referring to FIGS. 4 and 5, a description will be given of a method of selectively changing the USB device, so that the server need not implement the attach or detach process of the USB device. FIG. 4 is a sequence diagram corresponding to the system configuration shown in FIG. 3. With respect to a server A, a server B, the selector 1, the USB keyboard 31, and the USB mouse 32, FIG. 4 shows the connection between the servers A and B and the selector 1, the connection between the USB keyboard 31 and the USB mouse 32 and the selector 1, and the signal flows with peripheral devices when the selector changes the connection from the server A to the server B.

Firstly, the server A and the server B are connected to the selector 1. At this point, the selector 1 selects the server A in the initial state. The display 33 receives the video signals from the server A. Simultaneously, the enumeration process begins between the USB device emulation circuit 3 and the USB HC circuit on the server, and the USB device emulation circuit 3 on the selector 1 is configured to be a composite device of the USB keyboard 31 and the USB mouse 32.

Next, when the USB keyboard 31 is attached to the selector 1, the enumeration process begins between the USB keyboard 31 and the selector 1 to carry out the configuration. The selector 1 does not notify the enumeration process to the server, and accordingly, the enumeration process is not implemented on the server. The selector 1 transmits the key data to the selected server, namely, the server A only. With respect to the USB mouse 32, the same process is implemented, and the mouse data is transmitted only to the selected server.

When the selected server (electric connection) is changed from the server A to the server B, the display 33 starts to receive the video signals from the server B, and the transmission destination of the key data and mouse data is changed to the server B, with the UBS keyboard 31 and the USB mouse 32 maintaining connection with the selector 1. With the USB HC circuit 2, the UBS keyboard 31 and the USB mouse 32 can maintain connection with the selector 1. This control sequence will be described later. The select operation is accomplished without implementing the detach or enumeration process on the server even in changing the selected server. If the USB keyboard 31 is detached from the selector 1, the USB HC circuit 2 on the selector 1 carries out the detach process, and the server does not implement the detach process. With respect to the USB mouse 32, the same process is implemented. The server implements the detach process only when the server is disconnected from the selector 1.

A description will be given, with reference to FIG. 5, of the sequence of changing the transmission destination of the key data and the mouse data, from the server A to the server B, with the UBS keyboard 31 and the USB mouse 32 maintaining connection with the selector 1. FIG. 5 shows data signals between the select SW 5 in the selector 1, the USB HC circuit 2, the CPU 6, a USB device emulation circuit 3A, a USB device emulation circuit 3B, before and after the selected server is changed. The USB keyboard 31 and the USB mouse 32 operate in the same manner. Therefore, a description will be given of the USB keyboard 31 only, and a description of the USB mouse 32 is omitted. Also, the description will be focused on before and after the change of the selected server. At this point, the server A and server B are already connected.

The USB keyboard 31 is attached to the USB I/F 10 on the console side, and the enumeration process begins between the USB keyboard 31 and the USB HC circuit 2. After the USB keyboard 31 is configured, the USB HC circuit 2 requests the USB keyboard 31 for the key data, and "Interrupt" transfer starts. The USB keyboard 31 transmits the key data of one or more keys being pressed down, in response to an "Interrupt IN" request. The USB HC circuit 2 receives the key data and transmits the key data to the CPU 6. Here, the key data may be converted into the PS/2 or UART format, yet in either case, the data is transmitted in USB, PS/2, or UART format. The CPU 6 receives the key data and transmits the key data to the USB device emulation circuit 3 being coupled to the selected server. The USB device emulation circuit 3 receives the key data, and transmits the key data to the server being connected as the key data of the USB keyboard 31 included in the composite device of the USB device emulation circuit 3.

When the select SW 5 changes the selected server from the server A to the server B, the CPU 6 changes the transmission destination of the key data to the USB device emulation circuit 3B coupled to the port of the selector 1, which is connected by the server B. At this point, the USB HC circuit 2 maintains connection with the USB keyboard 31, without being influenced. Upon receiving the key data from the USB keyboard 31, the USB HC circuit 2 transmits the key data to the CPU 6. The CPU 6 transmits the key data received to the USB device emulation circuit 3B coupled to the port of the selector 1, which is connected by the server B.

If the USB keyboard 31 is detached, the USB HC circuit 2 implements the detach process, and does not notify the CPU 6 that the USB keyboard 31 has been detached. During the process, the USB device emulation circuits 3 respectively maintain connections with the servers.

Figure 6:
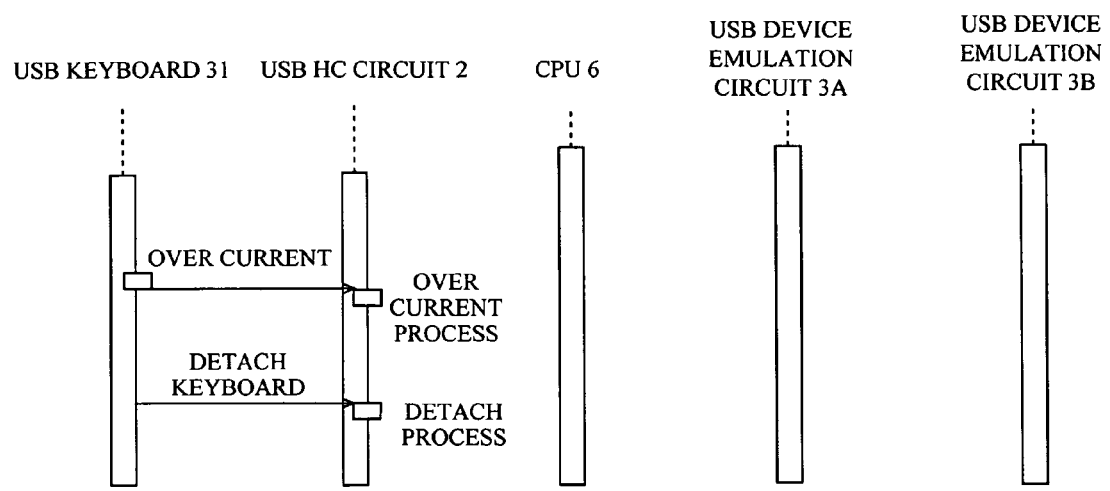
FIG. 6 shows signals when "Over Current" occurs.

Referring now to FIG. 6, when "Over Current" occurs, the USB HC circuit 2 implements a process relating to "Over Current", and does not notify the CPU 6. Therefore, the servers do not have to implement the process relating to "Over Current", and no load is applied to the servers. In addition, the CPU 6 maintains connections the USB device emulation circuit 3, allowing stable operations with no influence of "Over Current". The USB HC circuit 2 deals with not only the process relating to "Over Current" but also an error relating to the USB peripheral interface and an unexpected error and problem of the USB peripheral interface. Therefore, the USB HC circuit 2 is capable of providing the servers with stable operations.

In case of "Over Current", an LED should be provided to indicate the occurrence of "Over Current", alternatively, another type of LED that can indicate multiple colors should be provided so that one of the colors can be assigned for "Over Current" to let the user know the occurrence of "Over Current".

In addition, the OSD circuit 7 is configured to show the status of the USB device, so as to let the user know the status of the normal operation, Over Current, USB configuration, and a port status of the USB I/F 10.

As described, in accordance with the first embodiment of the present invention, the USB device emulation circuits 3 always maintain connections with the servers. This does not generate the enumeration process or detach process even when the selected server is changed or the USB device is attached or detached. The CPU 6, simultaneously with the afore-mentioned process of the USB device emulation circuit 3, changes the transmission destination of the data of the USB keyboard 31 and USB mouse 32 to the selected server. This makes the servers recognize that the keyboard and mouse are always being coupled. Therefore, it is possible to change the selected server promptly without burdening the servers. Furthermore, it is possible to provide stable operations to the servers even during the error process such as "Over Current".

Second Embodiment

Figure 7:
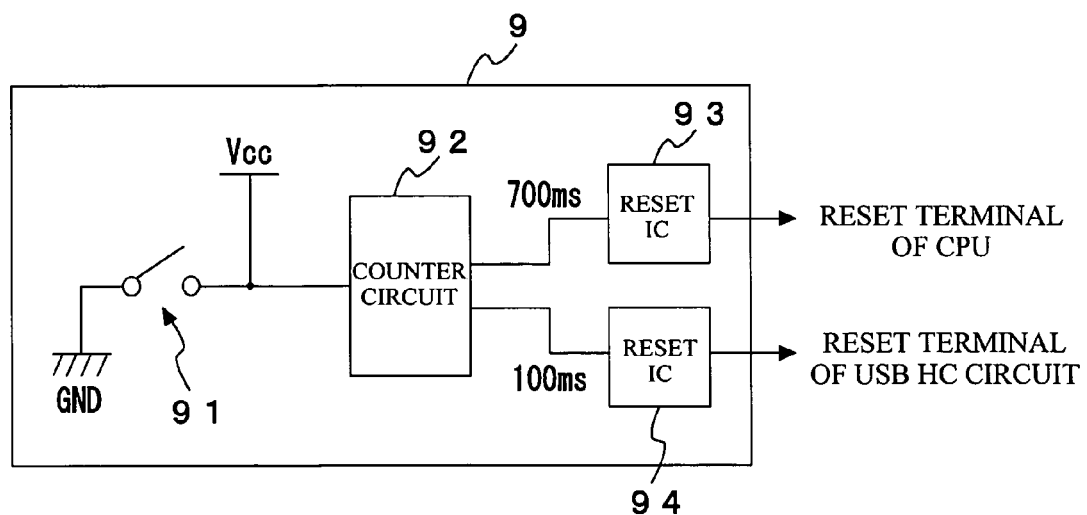
FIG. 7 is a diagram showing a reset circuit 9.

A description will now be given, with reference to accompanying drawings, of a second embodiment of the present invention. FIG. 7 shows a configuration of the reset circuit 9. The reset circuit 9 includes a reset switch 91, a counter circuit 92, a reset IC 93 for resetting the CPU 6, and a reset IC 94 for resetting the USB HC circuit 2. The reset SW 91 supplies the counter circuit 92 with 1 kHz clock to count every millisecond. For example, the reset IC 93 for resetting the CPU 6 is coupled to an output of 700 ms from the counter circuit 92, and the reset IC 94 for resetting the USB HC circuit 2 is coupled to an output of 100 ms from the counter circuit 92. This configuration makes it possible to reset the USB HC circuit 2 with a shorter period reset switch operation and to reset the CPU 6 with a longer period reset switch operation. That is to say, if there is a problem between the USB device attached to the selector 1 and the USB HC circuit 2, it is possible to recover the connection with the USB device to normal without affecting the server connected with the selector 1, by simply initializing the USB HC circuit 2 solely. In addition, with the longer period reset switch operation, the whole selector 1 can be reset.

FIG. 7 shows the reset circuit 9 controlled by hardware. However, the following control may be applicable. An I/O terminal of the CPU 6 is coupled to reset terminals on the USB HC circuit 2 such as the MCU 22 and the USB HC 21 shown in FIG. 2, so that an input from the reset circuit 9 into the CPU 6 is coupled to an interrupt terminal. For example, the interrupt terminal of the CPU 6 is configured to be High Active. If the CPU 6 detects an interruption from the reset circuit 9, the CPU 6 activates an internal counter thereof, and starts measuring the time. As described above, when 100 ms has passed, the level of the interrupt terminal is checked. If the level is low, it is determined that the shorter period reset switch operation has been done and the USB HC circuit 2 is reset. If the level is high, the level of the interrupt terminal is checked again, after 700 ms has passed. If the level is low, the USB HC circuit 2 is reset. If the level is high, the CPU 6 and the USB HC circuit 2 are reset.

Third Embodiment

Figure 8:
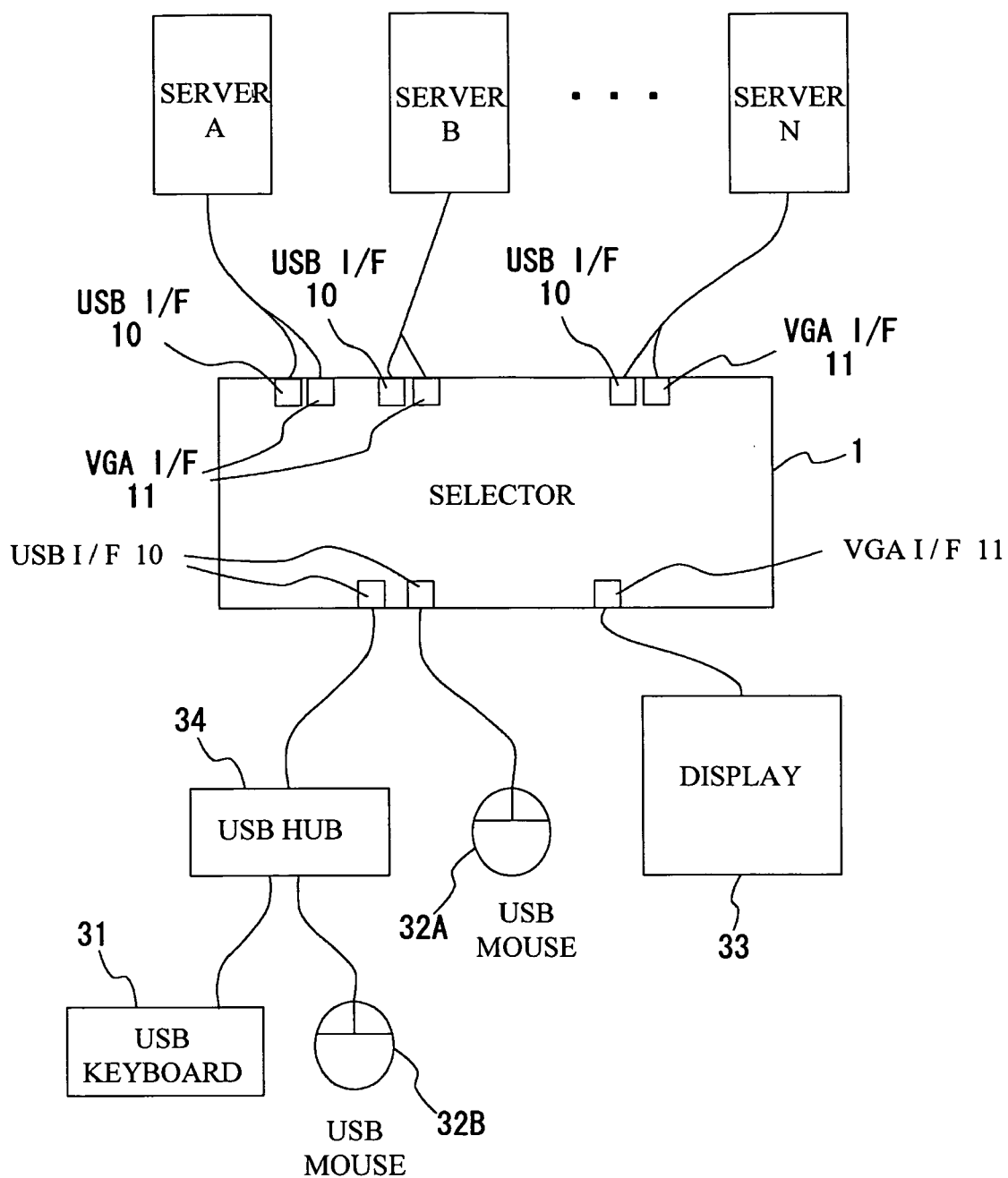
FIG. 8 is a block diagram in which the USB keyboard and the USB mouse are coupled to the selector 1 via a USB hub 34.

A description will now be given, with reference to the accompanying drawings, of a third embodiment of the present invention. FIG. 8 shows a configuration in which multiple mouses 32A and 32B are coupled to the selector 1 via a USB hub 34. On the selector 1 in such configuration, the USB HC circuit 2 implements the enumeration process for configuring the USB keyboard 31, the USB mouse 32A, and the USB mouse 32B attached to the USB hub 34, and transmits only the key data and the mouse data to the selected server.

In addition, the USB HC circuit 2 implements all processes relating to selectively changing and detaching the USB keyboard 31, the USB mouser 32A and 32B, and the USB hub 34, as described in the first embodiment of the present invention. Furthermore, the USB HC circuit 2 merges the mouse data respectively received from the USB mouse 32A and USB mouse 32B and transmits the merged data to the CPU 6 on the selector 1, acting as one mouse.

FIG. 8 exemplifies two USB mouses 32A and 32B, yet if there are three or more mouses provided, the same process is implemented. In the same manner, if multiple keyboards are attached, the USB HC circuit 2 acts as one keyboard. This eliminates the servers from getting involved in the enumeration process and the detach process. Furthermore, the selected server communicates with the USB device emulation circuit 3 serving as a composite device of (a set of) the USB keyboard 31 and the USB mouse 32. Therefore, the load for the processes is smaller than a case where the USB devices are directly connected with the server.

Fourth Embodiment

Figure 9:
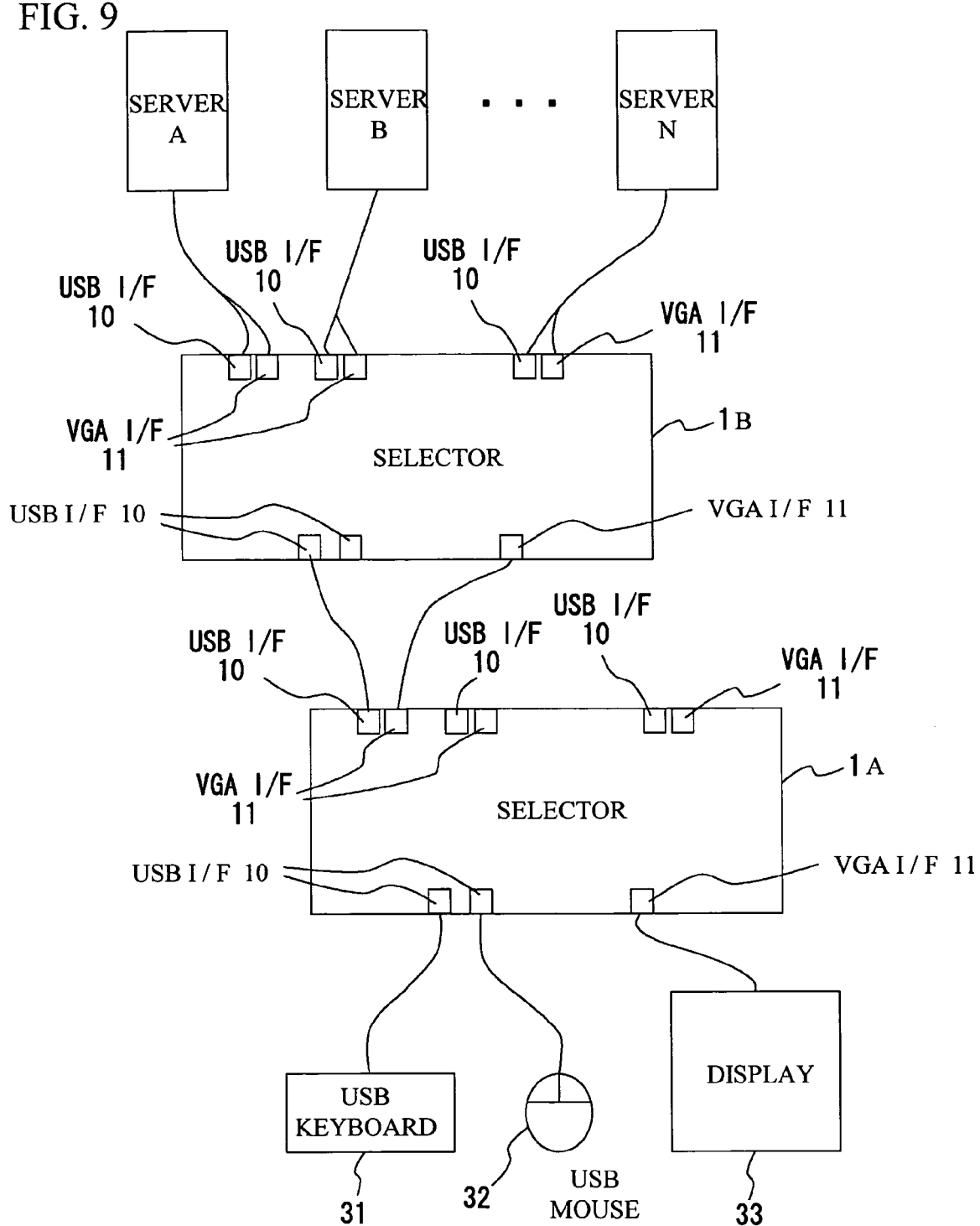
FIG. 9 shows a cascade connection of selectors 1A and 1B.

A description will now be given, with reference to the accompanying drawings, of a fourth embodiment of the present invention. When the selector 1 is manufactured as a product, there is a physical limitation on the number of the ports provided thereon. This limits the number of the servers that can be controlled by the selector 1. For example, if the product has 16 ports, 16 servers at most can be connected. If the product has 32 ports, 32 servers at most can be connected. However, it is impossible to connect more servers. As a method for solving this drawback, a cascade connection, in which a selector is connected to another selector, is available. FIG. 9 shows an example of the cascade connection.

The USB keyboard 31, the USB mouse 32, and the display 33 are attached to the console side of a selector 1A. The USB I/F 10 and the VGA I/F 11 provided on the server side of the selector 1A are respectively coupled to the USB I/F 10 and the VGA I/F 11 provided on the console side of a selector 1B. The servers are connected to the server side of the selector 1B.

If two selectors are simply connected, a composite device having the USB keyboard 31 and the USB mouse 32 is coupled to the selector 1B. The key data and the mouse data are simply transmitted from the selector 1A. In other words, it is impossible to control the select operation of the selector 1B from the selector 1A. Now, a description will be given, with reference to FIG. 10, of a procedure of the cascade connection between the selectors 1A and 1B and how the selector 1A learns the cascade connection. The USB HC circuit 2 on the selector 1B detects the cascade connection (step S1), and checks a VID (Vender ID information) and a PID (Product ID information) of the USB device being attached (step S2). With the afore-mentioned VID and PID, the USB device emulation circuit 3 of the selector 1A serving as the composite device of the USB keyboard 31 and the USB mouse 32 (the cascade connection) is detected (step S3/YES), a cascade connection notification command is transmitted to the USB device emulation circuit 3 of the selector 1A by a vendor request that complies with the USB specification (step S5). If the key data (select control signal) is received to shift to a select control mode, the USB HC circuit 2 on the selector 1B is configured to transmit a select result to the selector 1A by the vendor request that complies with the USB specification. The USB device emulation circuit 3 on the selector 1A records a status of the cascade connection. The afore-mentioned select control mode is a control method for selectively changing the connection between the port (the server being connected) of the selector and the console other than switching. The CPU 6 on the selector 1A stops transmitting the normal key data or the mouse data due to the key input of special procedure, the vendor request, or the like, and transmits the select control signal to the selector 1B in cascade connection. In this manner, it is possible to select the port (the server being connected) of the selector 1B.

Figure 11:
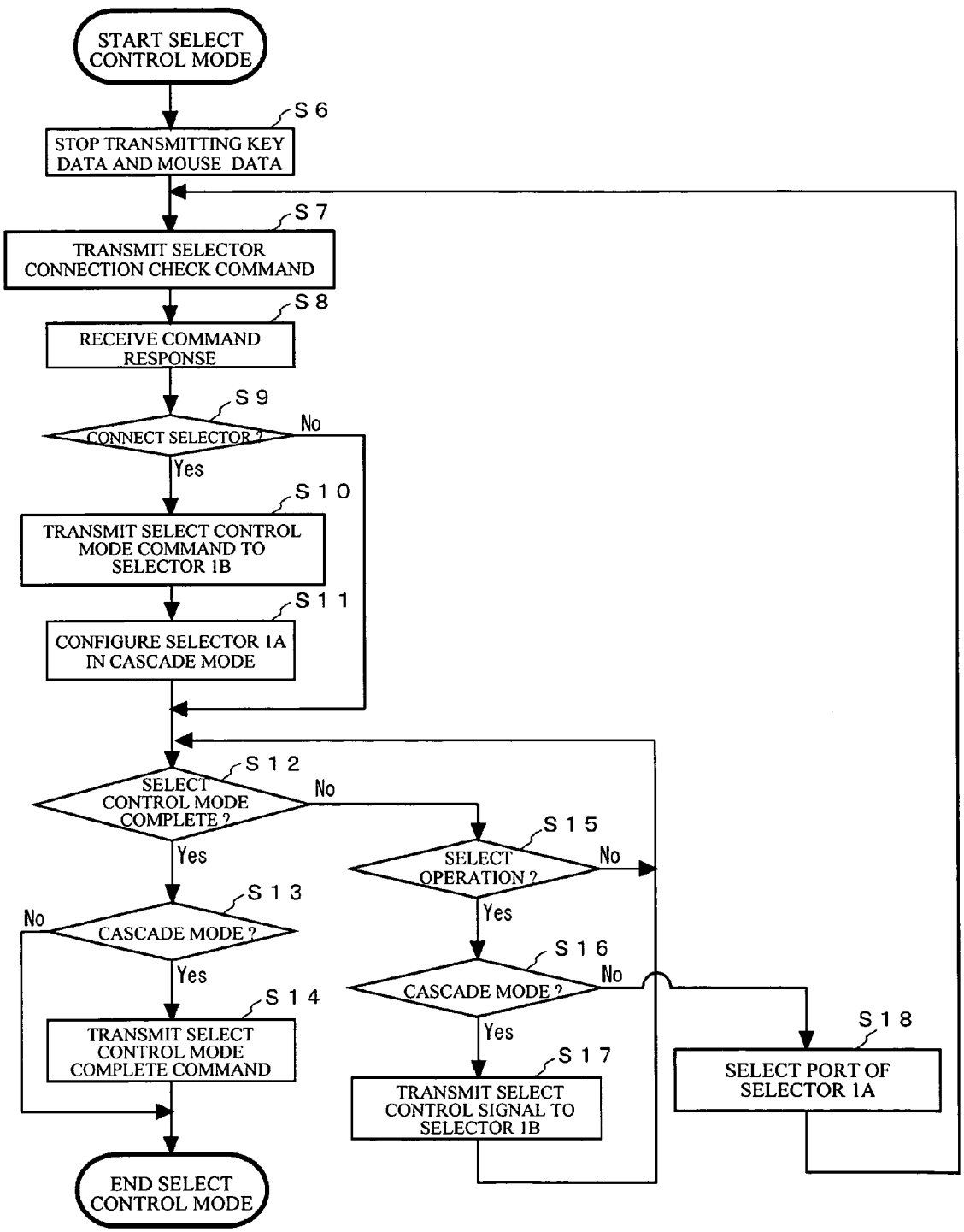
FIG. 11 is a flowchart in select control mode.

The select control signal, for example, utilizes the key data or the mouse data that has been received in the select control mode. The method for selecting the port, for example, is append numbers to the ports and press a number key or function key on the keyboard corresponding to the port number or sequentially select with arrow keys. Referring now to FIG. 11, a flowchart of the select control mode will be described. As examples of key operation, press Ctrl+Alt+Shift keys (first key input) is used for shifting to the select control mode, the number key is used for the port selection (second key input), and Enter key is used for making the select decision and completing the select control mode.

Figure 10:
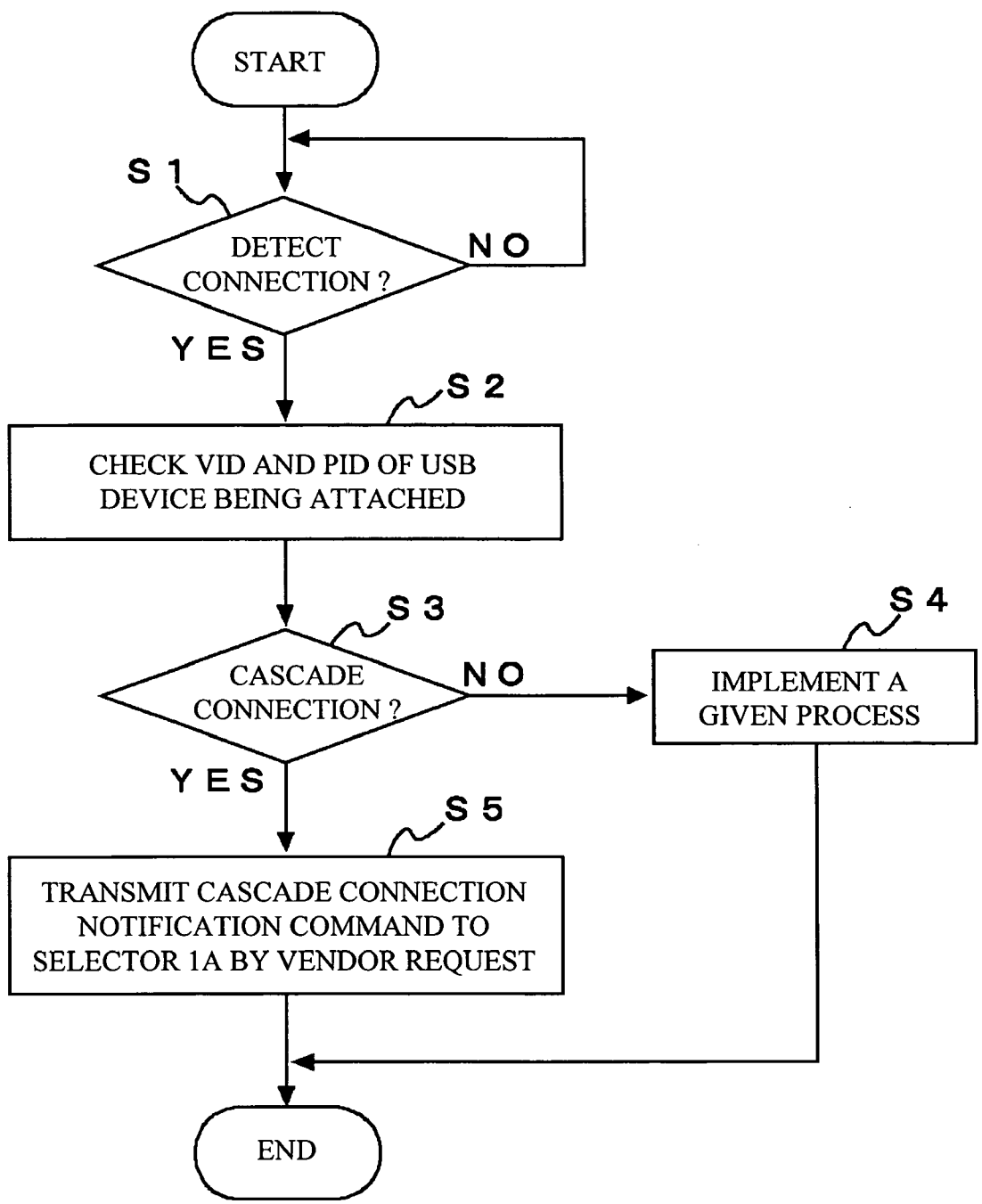
FIG. 10 is a flowchart showing a procedure to detect the cascade connection of the selectors.

According to the flowchart shown in FIG. 10, The USB device emulation circuit 3 on the selector 1A records the status of the cascade connection of the selector 1A. The CPU 6 of the selector 1A receives the key data of Ctrl+Alt+Shift keys from the USB keyboard 31, and shifts to the select control mode, and then stops transmitting the key data and the mouse data to the USB device emulation circuit 3 (step S6). Next, the selector 1A transmits a selector connection check command to the USB device emulation circuit 3 of the selector 1A to see whether the port currently being connected is connected by the selector 1B (step S7). Whether the USB device emulation circuit 3 is in cascade connection is recorded in the USB device emulation circuit 3. According to the recorded information, the selector 1A is checked whether the port of the selector 1A is connected by a selector. If the selector 1B is connected to the port, a response is given to the CPU 6 that a selector is being connected. If a device other than the selector is being connected, a response is given to tell that the device being connected is not a selector. Then, the CPU 6 receives the response from the USB device emulation circuit 3 (step S8). If the selector (the selector 1B in accordance with the present embodiment) is connected (step S9/YES), the key data of Ctrl+Alt+Shift keys is transmitted to shift to the select control mode (step S10), and configures the USB HC circuit 2 on the selector 1A in cascade mode (step S11). A flag for configuration is provided on a RAM of the CPU 6. If the selector is not connected, a state for completing the select control mode is processed to change the port of the selector 1A (step S12). If the Enter key has been pressed to complete the select control-mode (step S12/YES), go to a cascade mode confirmation state (step S13). If it is in cascade connection (step S13/YES), a select control mode complete command is transmitted to the selector 1B and completes the select control mode (step S14). If it is not in cascade connection (step S13/NO), completes the process.

If the Enter key has not been received to indicate that the select control mode is completed (step S12/NO), it is checked whether the select operation has been performed (step S15). To check the select operation, the number key, the function key, or the arrow key is detected to specify the corresponding port number. After the port is specified, it is checked whether the selector 1A is in cascade connection (step S16). If the selector 1A is in cascade connection (step S16/YES), the select command (key data) is transmitted to the selector 1B to change to the afore-mentioned port number (step S17). The selector 1B selects the port and transmits the selected result to the selector 1A.

The selected result is transmitted by the command that complies with the vendor request specified by the USB Specification 1.1 or later. Upon receiving the select result, the selector 1A repeats from the state for completing the select control mode.

If it is not in cascade mode (step S16/NO), the port of the selector 1A is changed (step S18). Then, go to the state for transmitting the selector connection check command to see whether the selector 1B is connected to the changed port, and repeat the afore-mentioned procedure.

Figure 12:
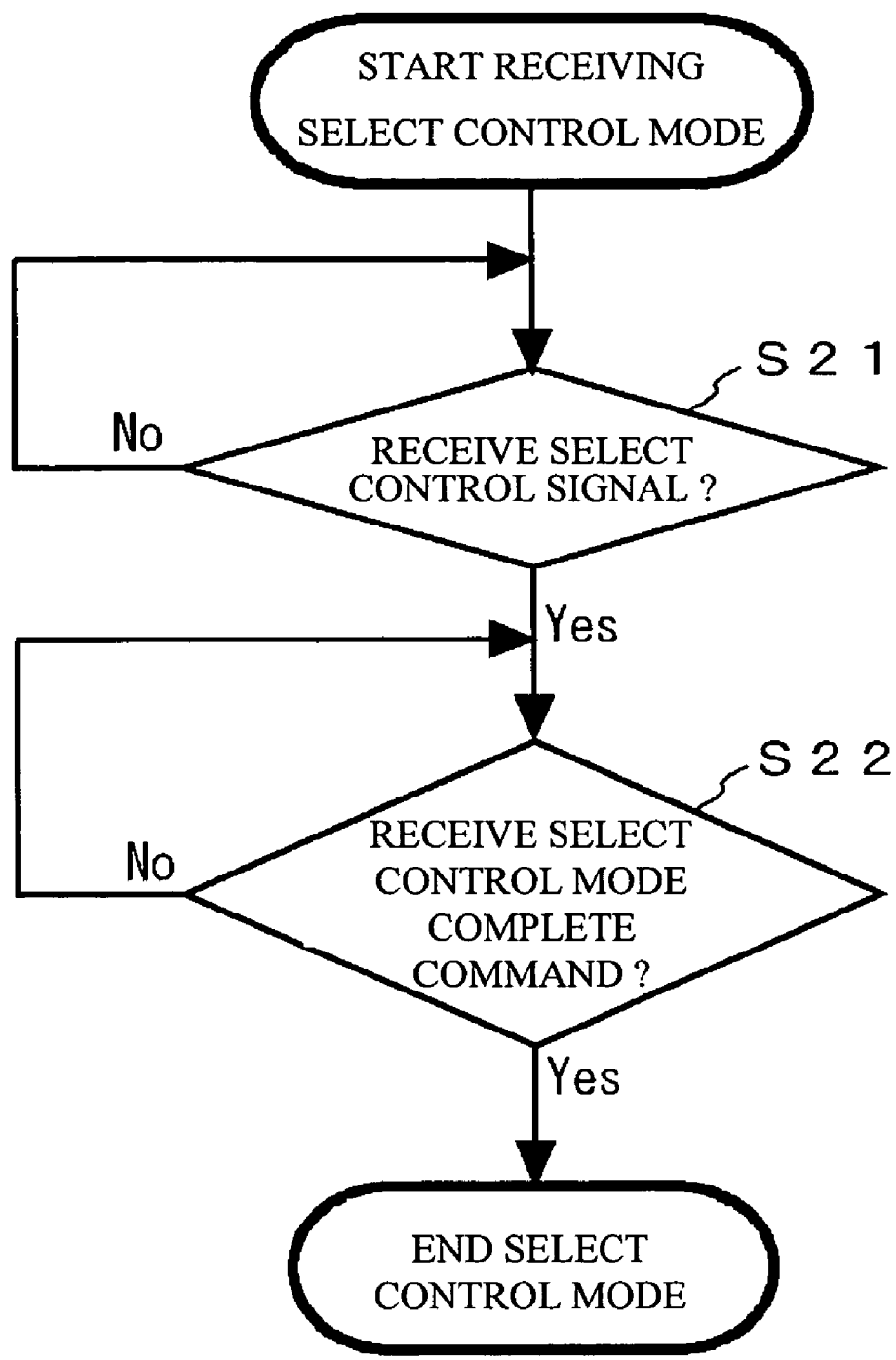
FIG. 12 is a flowchart of the selector 1B in select control mode.

FIG. 12 shows a flowchart of the selector 1B. The selector 1B receives the key data (Ctrl+Alt+Shift keys) to shift to the select control mode from the selector 1A (step S21), and configures the selector 1B itself to transmit the selected result to the selector 1A by the vendor request that complies with the USB specification. Next, when the select control mode complete command is received (step S22), the select control mode is completed.

In the cascade connection method described above, it is possible to increase the number of the servers that can be controlled by the selector. For example, the product with 16 ports allows 256 servers at most to be connected. The product with 32 ports allows 1,024 servers at most to be connected. The number of the controllable servers can be increased.

Fifth Embodiment

A description will now be given of a fifth embodiment of the present invention, with reference to the accompanying drawings. In the first through fourth embodiments, the selector 1 includes the USB device emulation circuit 3 in order to provide the operations of the devices such as the USB keyboard 31 and the USB mouse 32 to one or more servers. This enables eliminating the attach/detach process of changing the USB devices, reduces the burden on the servers, and achieves stable operation on the server. However, depending on the user, there is the need for making use of arbitrary USB keyboard 31 and USB mouse 32 having specific functions. In the methods described above, the USB keyboard 31 and the USB mouse 32 operate as the standard devices, and cannot meet the need.

In accordance with the present embodiment of the present invention, descriptors (data for reporting the device attribute) of the USB keyboard 31 and the USB mouse 32, attached to the selector 1, are transmitted to the USB device emulation circuit 3, so that the USB device emulation circuit 3 emulates the operations of the USB keyboard 31 or the USB mouse 32. Referring to a sequence diagram shown in FIG. 13, the method for meeting the afore-mentioned need will be described.

Figure 13:
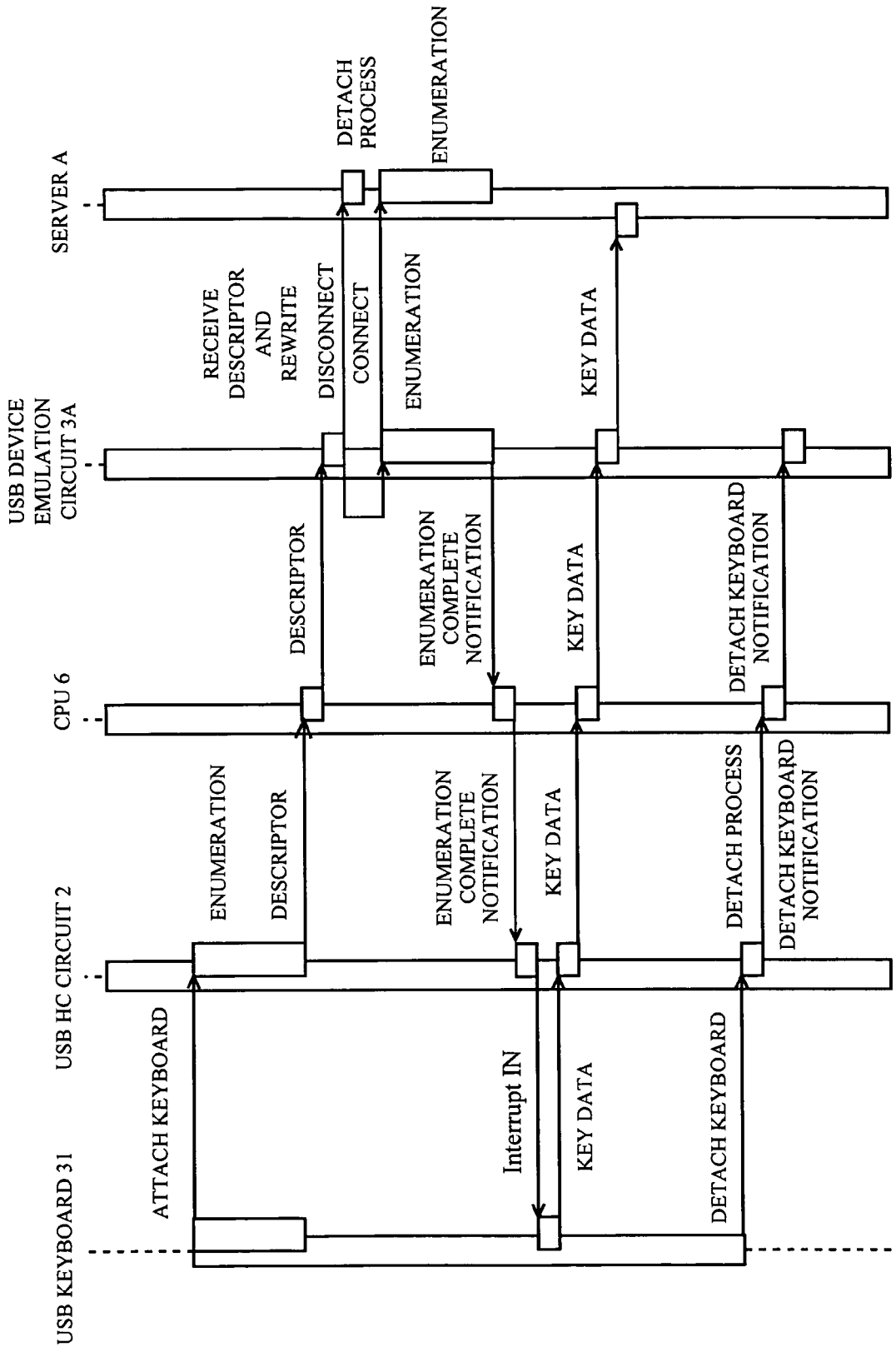
FIG. 13 is a signal sequence diagram between the USB keyboard 31, the selector 1, and the server A.

FIG. 13 shows an example in which the USB keyboard 31, the selector 1, and the server A are connected. In particular, a description will be given of the USB HC circuit 2, the CPU 6, the USB device emulation circuit 3 included in the selector 1. In addition, the server A is connected to the selector 1 and the USB keyboard 31 is not attached. In this state, the USB keyboard 31 is attached now. Then, the enumeration process starts between the USB HC circuit 2 on the selector 1 and the USB keyboard 31.

When the USB HC circuit 2 completes the enumeration process, the USB HC circuit 2 transmits the descriptor received from the USB keyboard 31, to the CPU 6. The CPU 6 transmits this descriptor to the USB device emulation circuit 3. When the USB device emulation circuit 3 receives the descriptor from the CPU 6, the USB device emulation circuit 3 operates a disconnect process to disconnect the server once, and rewrites the descriptor of the USB device emulation circuit 3 with the descriptor that has been received from the CPU 6. The disconnect process, for example, is that the USB device emulation circuit 3 operates as if the USB device were disconnected from the server (whereas the cable is connected in practice), by shutting down the power supplied to a SIE (Serial Interface Engine) in the USB device emulation circuit 3.

After a given period has passed from the disconnect process and the server completes the disconnect process, the USB device emulation circuit 3 operates a connect process. The connect process is that the USB device emulation circuit 3 operates as if the USB device were coupled to the server, by supplying the power to the above-mentioned SIE. Here, the descriptor of the USB device emulation circuit 3 has been rewritten with the descriptor of the USB keyboard 31. Therefore, the server views the USB device emulation circuit 3 as the USB keyboard 31, after the enumeration process.

The enumeration process is completed, and the USB device emulation circuit 3 notifies the completion of the enumeration process to the CPU 6. The CPU 6, the enumeration complete notification, transmits an enumeration complete notification to USB HC circuit 2. Upon receiving the enumeration complete notification, the USB HC circuit 2 issues "Interrupt IN" to request the USB keyboard 31 for the key data. The USB keyboard 31 receives the request, and returns the key data if there is a change in a key press state. The key data is transmitted to the selected server by way of the USB HC circuit 2, the CPU 6, the USB device emulation circuit 3. If a device driver of the USB keyboard 31 or the application corresponding to the device driver is installed, not shown, it is possible to transmit the command to the keyboard by way of a reverse route.

In this manner, it is possible to use an arbitrary USB keyboard 31. Once the USB keyboard 31 is attached and the enumeration process is completed between the servers and the USB device enumeration circuits 3, the servers do not have to implement the enumeration process or detach process when the selected server is changed. In addition, when the USB keyboard 31 is detached, the USB HC circuit 2 implements the detach process. The servers do not have to operate the detach process, and the server burden can be reduced. When the keyboard 31 is detached, from the USB HC circuit 2, the USB device emulation circuit 3 is notified that the USB keyboard 31 has been detached, by way of the CPU 6. The USB device emulation circuit 3 cancels the request from the device driver on the server, while the USB keyboard is being detached. This enables stable operation. An arbitrary USB mouse 32 can be used in the same manner. An arbitrary USB keyboard 31 and an arbitrary USB mouse 32 can be used together, by respectively providing the USB device emulation circuits 3 for the USB keyboard 31 and the USB mouse 32. Alternatively, two or more USB devices can be emulated in one circuit, by using the USB device emulation circuit 3 having multiple "Control transfer functions", and multiple arbitrary USB keyboards 31 and USB mouses 32 can be used simultaneously.

As described above, arbitrary USB keyboard 31 and USB mouse 32 can be used in the above-mentioned method. The specific capabilities of the USB keyboard 31 and USB mouse 32 can be used. The USB devices can be selectively changed without the enumeration process or the detach process generated when the USB devices are attached or detached.

Sixth Embodiment

A description will be given of a sixth embodiment of the present invention. A description will be given, with reference to FIG. 14, of the sixth embodiment where the USB devices have priority over other interfaces, whereas not only the USB keyboard 31 and the USB mouse 32 but also the keyboard and the mouse having different interfaces are attachable.

Figure 14:
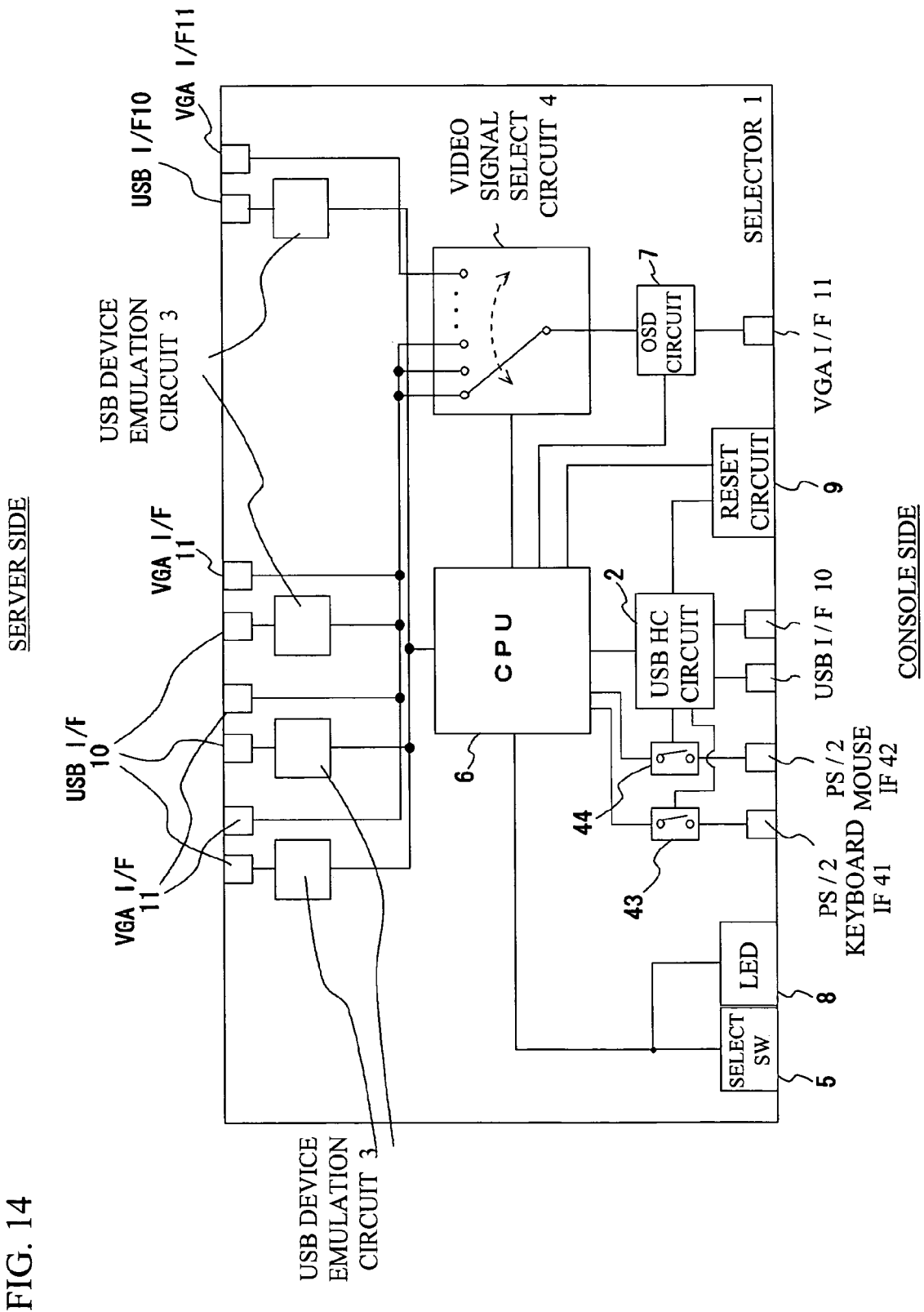
FIG. 14 is a diagram of the selector having PS/2 mouse I/F and PS/2 keyboard I/F.

FIG. 14 includes, in addition to the configuration shown in FIG. 1, there are provided a PS/2 keyboard I/F 41, a PS/2 mouse I/F 42, a switching circuit 43 for switching connection of the PS/2 keyboard I/F 41, and a switching circuit 44 for switching connection of the PS/2 keyboard I/F 42. The PS/2 keyboard I/F 41 and the PS/2 keyboard I/F 42 are connected in such a manner that signals from the PS/2 keyboard I/F 41 and the PS/2 keyboard I/F 42 are sent and received to the CPU 6 via the switching circuits 43 and 44 respectively, and the USB HC circuit 2 controls the switching circuits 43 and 44. Here, a description will be given of the connection of the mouse for simplification. Now, the PS/2 mouse is connected to one of the PS/2 interfaces. In this state, if the USB mouse 32 is attached, the USB HC circuit 2 detects the USB mouse 32, and controls the switching circuit 44 to disconnect between the PS/2 interface and the CPU 6. This disables the PS/2 mouse, when the USB mouse 32 is attached to the selector 1. Accordingly, only the USB mouse 32 can be used. The interface is not limited to the PS/2 interface, and another serial interface is applicable. In addition, the USB keyboard 31 can be controlled in the same manner. Further, the CPU 6 may be configured to control the switching circuits 43 and 44.

Figure 15:
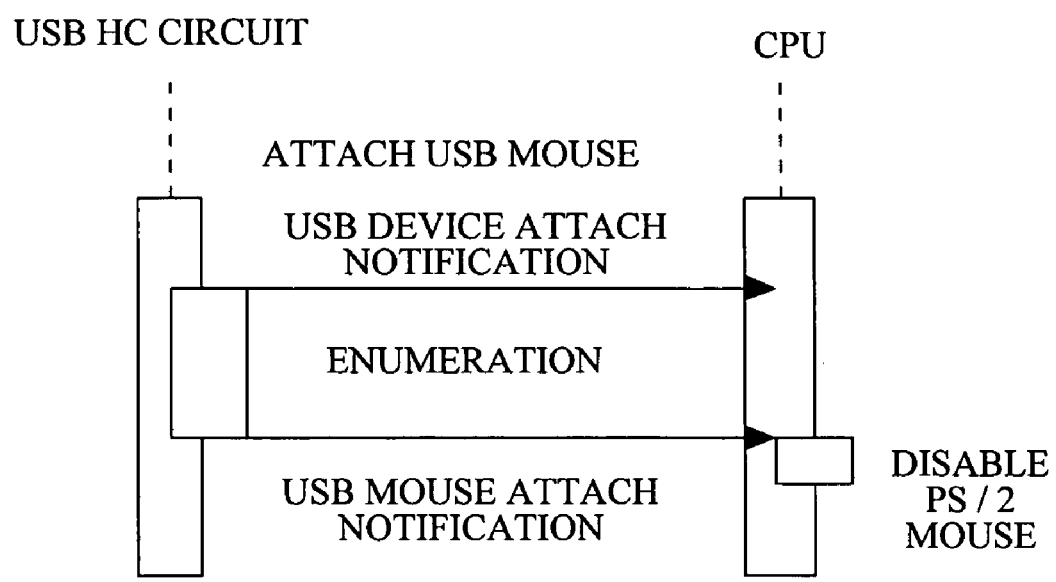
FIG. 15 shows a procedure to disable the PS/2 mouse by software.

In the above-mentioned method, the PS/2 mouse is disabled by the switching circuits 43 and 44 by hardware, yet it is possible to control the switching circuits 43 and 44 by software. This method will be described, with reference to FIG. 15. FIG. 15 is a sequence diagram in which the USB mouse 32 is attached to the selector 1 to which the PS/2 mouse is attached. When the USB mouse 32 is attached to the selector 1, the USB HC circuit 2 transmits a USB device attachment detect notification to the CPU 6. When the enumeration process is implemented between the USB mouse 32 and the USB HC circuit 2 and is then completed, the USB HC circuit 2 transmits an attach notification of the USB mouse 32 to the CPU 6. The CPU 6 disables the PS/2 interface. This disables the PS/2 mouse when the USB mouse 32 is attached to the selector 1 so that only the USB mouse 32 can be used. In addition, the interface is not limited to the PS/2, and another serial interface is applicable. Further, the USB keyboard 31 can be controlled in the same manner. Both interfaces may be configured to use simultaneously instead of selectively changing between the USB and other interfaces.

Seventh Embodiment

A description will be given of a seventh embodiment of the present invention. The selector 1 further includes capabilities of updating firmware via the USB interface in order to enable new functions of the USB keyboard 31 and the USB mouse 32 and enhance the functions of the selector 1 in accordance with the present embodiment of the present invention. In addition, the firmware is configured automatically installable for simplifying the update procedure. The selector 1 is configured to include the firmware of the CPU 6 that controls the whole selector 1, the firmware of the MCU 22 that controls the USB HC circuit 2, and the firmware of MCU on the USB device emulation circuit 3. Referring to FIGS. 16 through 24, a firmware update method will be described.

Figure 16:
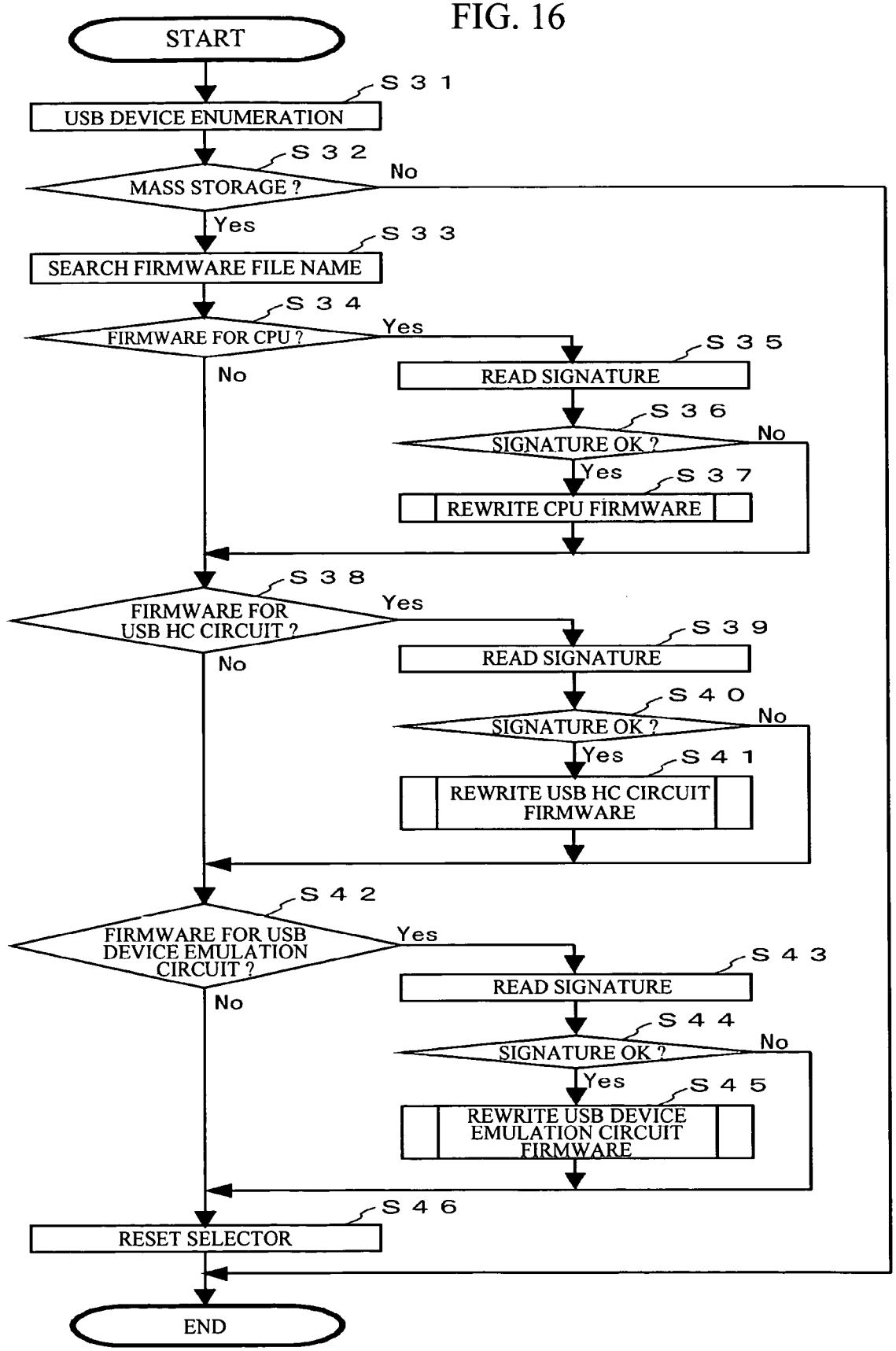
FIG. 16 is a flowchart of firmware rewrite control by the USB HC circuit 2.

FIG. 16 shows a flowchart of the firmware rewrite control operated by the USB HC circuit 2. When the USB device is attached to the selector 1, the USB device enumeration process is implemented (step S31) to check a descriptor acquired from the USB device whether the USB device belongs to Mass Storage Class, which is an additional specification for connecting an external storage device such as a hard disk (step S32). If it is the Mass Storage Class (step S32/YES), the USB device is recognized as a disk drive, and the USB HC circuit 2 searches the USB device for a firmware file stored thereon (step S33). With respect to the file name, three file names are prepared for the CPU 6, the USB HC circuit 2, and the USB device emulation circuit 3, which can be uniquely identified. If it is not the Mass Storage Class (step S32/NO), exit from the process.

If the firmware file for CPU 6 is found (step S34/YES), refer to a signature file thereof (step S35) and confirm the signature (step S36). Keys necessary for the signature are stored in the selector 1 and the USB device being attached to the selector 1. The signature is confirmed with the keys. If the file is determined a correct one by confirming the signature (step S36/YES), the firmware for the CPU 6 is rewritten (step S37).

Figure 17:
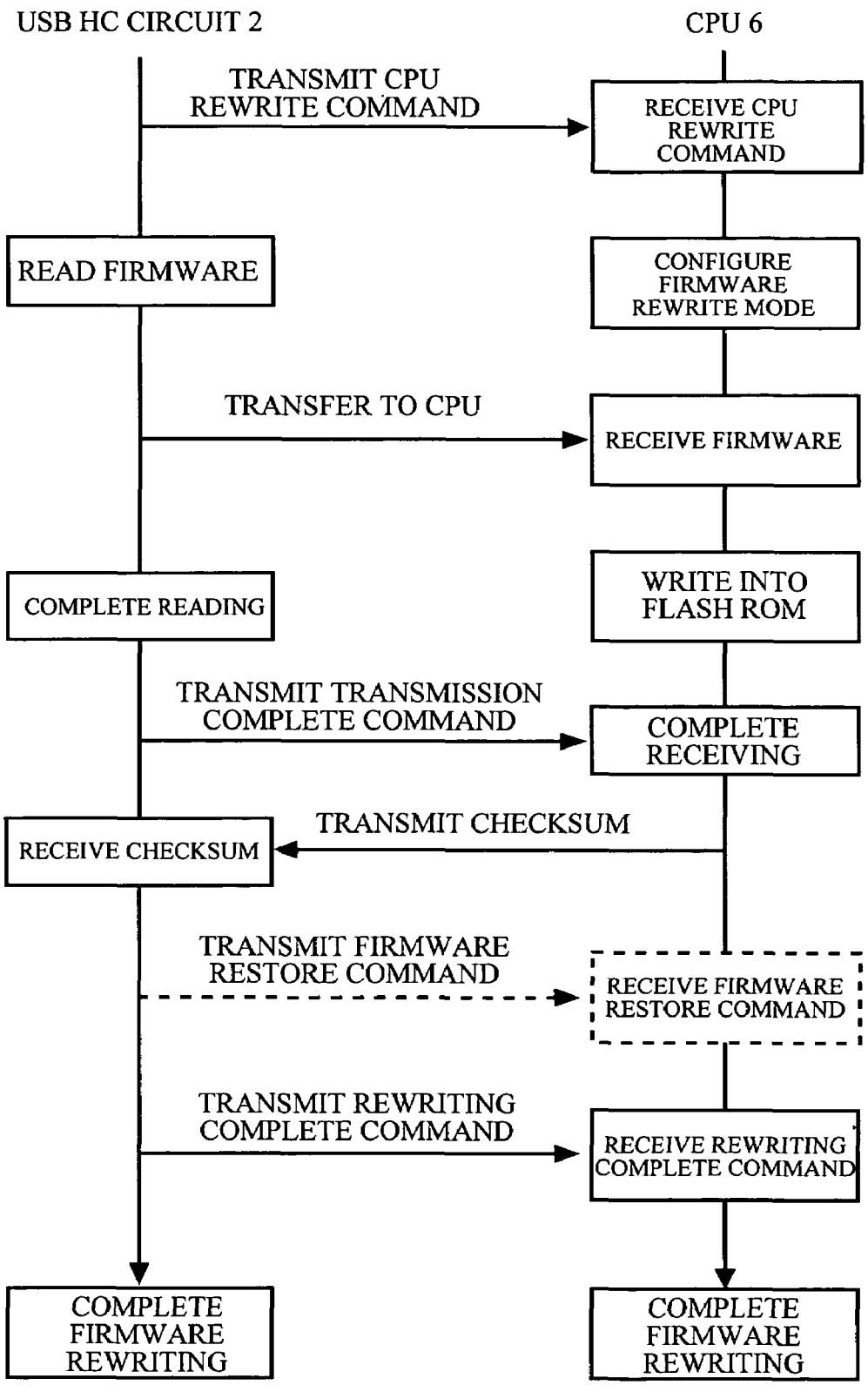
FIG. 17 shows a procedure of CPU firmware rewriting.

A description will be given, with reference to FIG. 17, of a procedure for rewriting the CPU firmware implemented by the USB HC circuit 2 and the CPU 6. Firstly, the USB HC circuit 2 transmits a CPU firmware rewrite command to the CPU 6. Then, the CPU 6 receives the CPU firmware rewrite command, and configures the CPU 6 in a firmware rewrite mode. Next, the USB HC circuit 2 reads the firmware file from the USB device, and transfers the file to the CPU 6. This process is repeated until the USB HC circuit 2 completes reading the firmware.

Upon receiving the firmware, the CPU 6 writes the firmware into a flash ROM. The CPU 6 repeats until the CPU 6 completes receiving the whole firmware. Having completed receiving, the CPU 6 transmits a checksum of the firmware to the USB HC circuit 2. Upon receiving the checksum, the USB HC circuit 2 compares the received checksum with the checksum read out of the USB device. If the checksums are different, it is determined that the rewriting into the firmware has been failed and a firmware restore command is transmitted to the CPU 6. Upon receiving the firmware restore command, the CPU 6 copies the firmware stored in another block of the flash ROM onto a boot region so as to restore to the state prior to the firmware rewriting. If the checksums are equal, or if the firmware restore command is transmitted, a rewriting complete command is transmitted to the CPU 6 to complete the CPU firmware rewriting.

Figure 18:
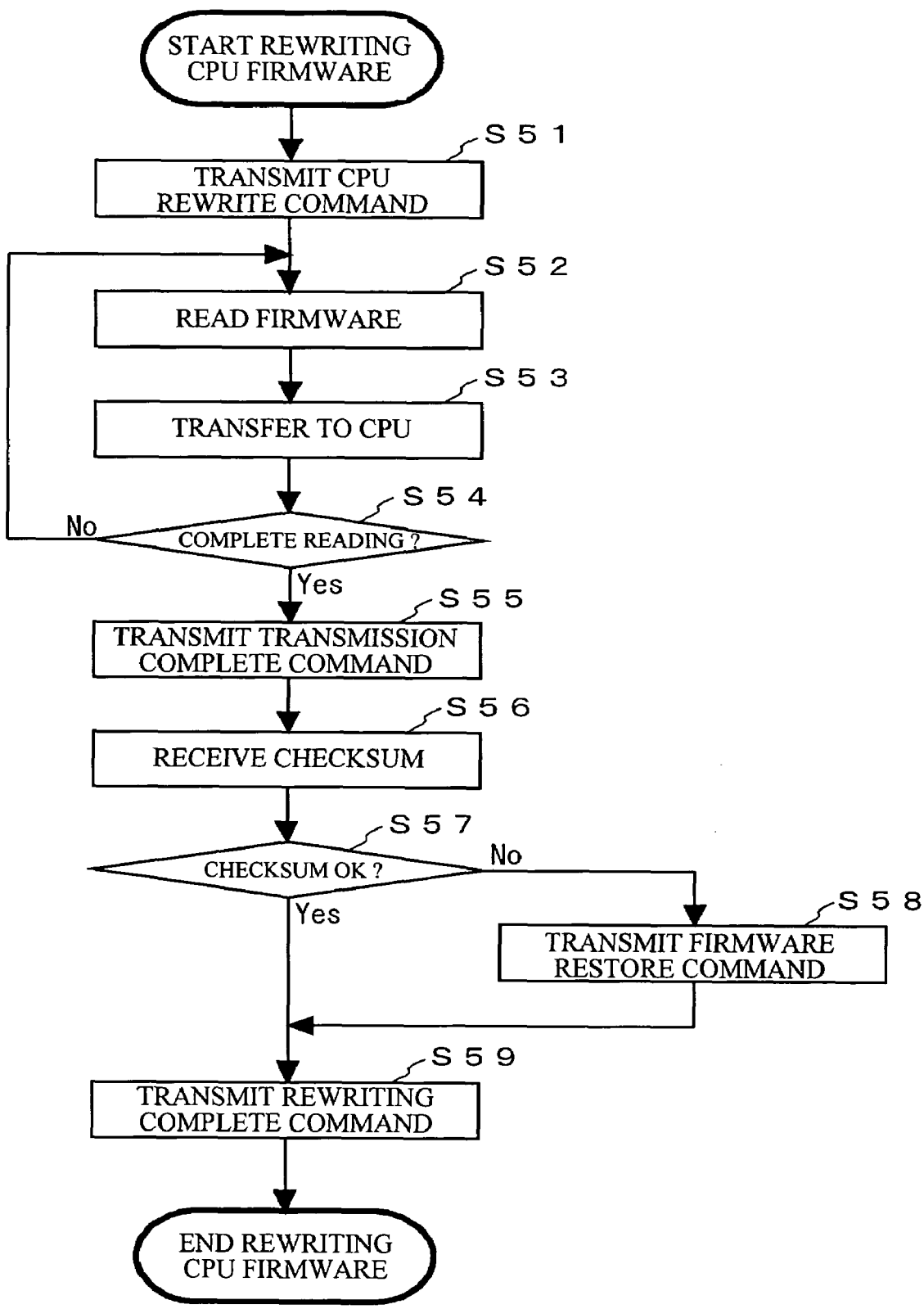
FIG. 18 is a flowchart of a procedure of the USB HC circuit 2 for rewriting the CPU firmware.

Next, a description will be given, with reference FIG. 18, of the flowchart of the CPU firmware rewrite process of the USB HC circuit 2. Firstly, the USB HC circuit 2 transmits the CPU firmware rewrite command to the CPU 6 (step S51). Then, the USB HC circuit 2 reads the firmware file from the USB device (step S52), and transfers the file to the CPU 6 (step S53). This process is repeated to complete reading the firmware (step S54). If the firmware reading is completed (step S54/YES), a transmission complete command is transmitted to the CPU 6 (step S55), and the USB HC circuit 2 waits for the checksum to be transferred from the CPU 6. When the checksum is received (step S56), the USB HC circuit 2 compares the received checksum with the checksum that has been read out of the USB device (step S57). If the checksums are different (step S57/NO), the firmware restore command is transmitted to the CPU 6 (step S58). Then, the rewriting complete command is transmitted to the CPU 6 and the process is completed (step S59).

Figure 19:
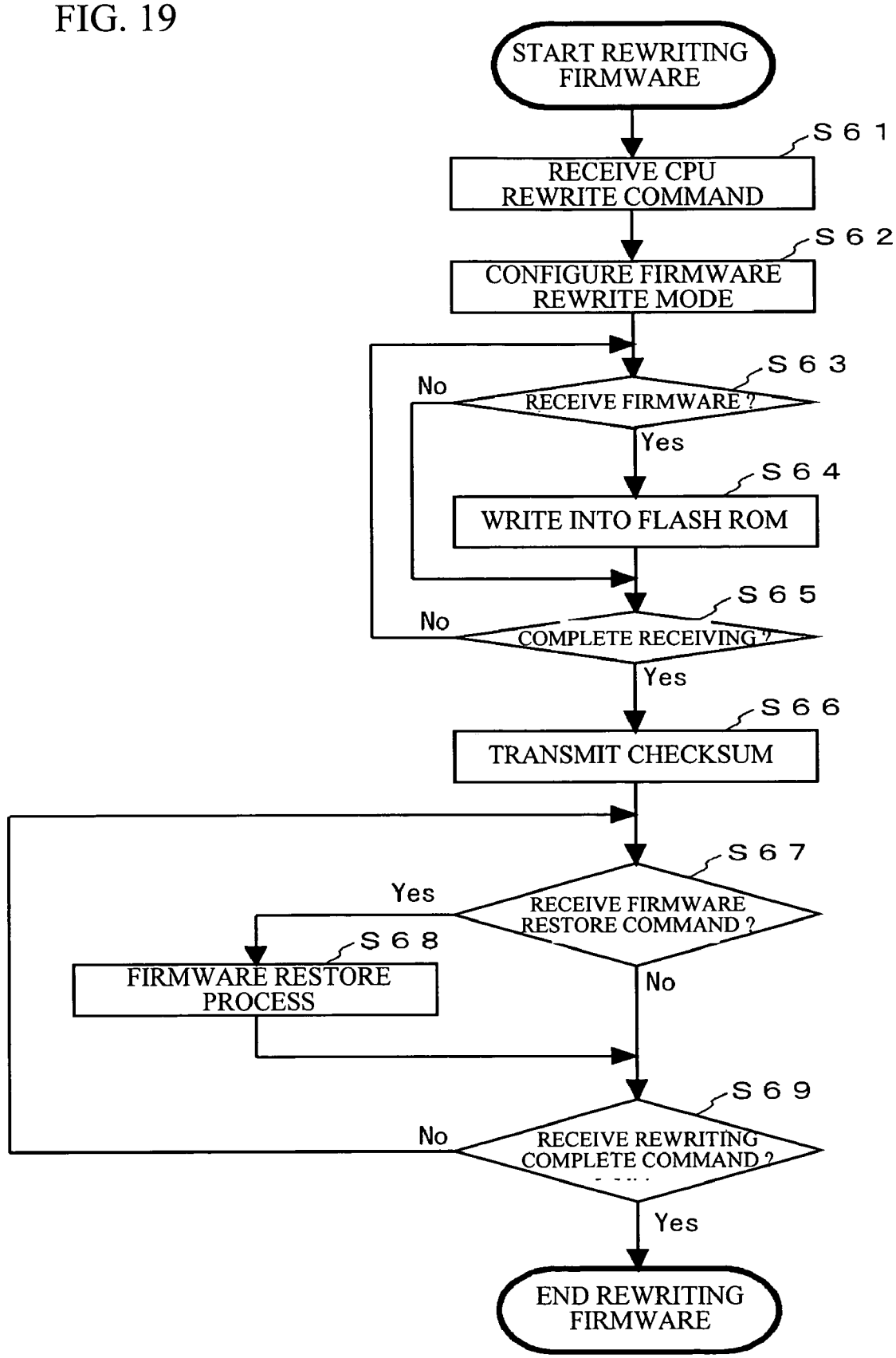
FIG. 19 is a flowchart of the CPU 6 for rewriting the CPU firmware.

Now, referring to FIG. 19, a description will be given of a flowchart of rewriting the CPU firmware operated by the CPU 6. When the CPU 6 receives the CPU rewrite command (step S61), the CPU 6 configures to be in firmware rewrite mode (step S62). Then, upon receiving the firmware (step S63/YES), the CPU 6 writes the firmware into the flash ROM (step S64). This process is repeated until the CPU 6 completes receiving the whole firmware (step S65). The CPU 6, having completed receiving (step S65/YES), transmits the checksum of the firmware to the USB HC circuit 2 (step S66). Then, the CPU 6 checks whether the firmware restore command has been received from the USB HC circuit 2 (step S67). If the CPU 6 receives the command (step S67/YES), the CPU 6 implements the firmware restore process (step S68). If the rewriting complete command is received (step S69/YES), the CPU 6 completes rewriting the firmware.

If the firmware rewriting on the CPU 6 is completed, go to the step S38 shown in FIG. 16 to check whether there is a firmware for the USB HC circuit 2. If the firmware provided for the USB HC circuit 2 has been found with the firmware file name, the signature file thereof is read (step S39) to confirm the signature (step S40). If the file is a correct one by confirming the signature (step S40/YES), the USB HC circuit firmware starts to be rewritten (step S41).

Figure 20:
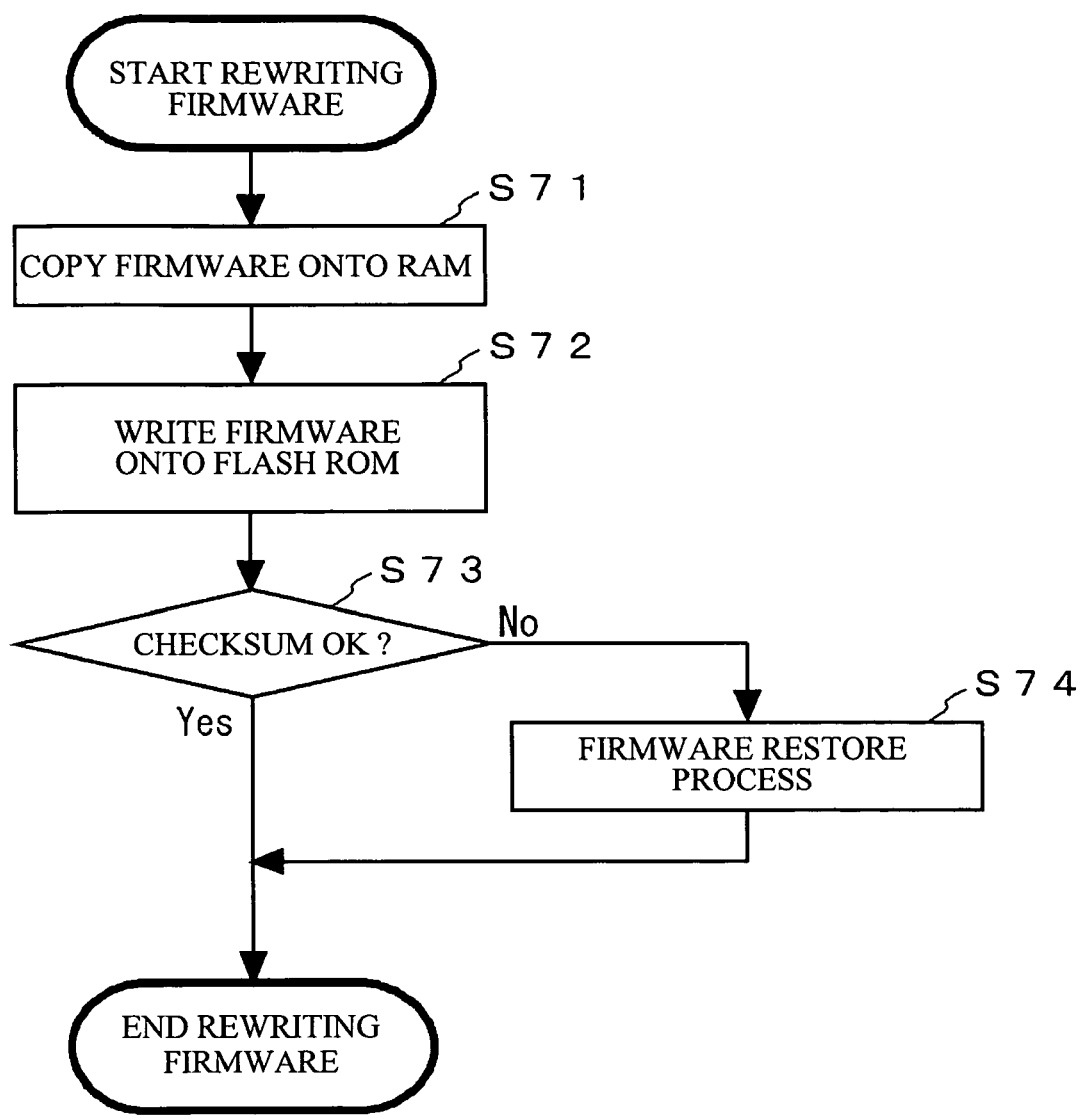
FIG. 20 is a flowchart of the firmware rewrite control by the USB HC circuit 2.

FIG. 20 is a flowchart of rewriting the firmware of the USB HC circuit 2. The US HC circuit 2 reads the firmware file from the USB device to write the file into the flash ROM of the USB HC circuit 2 (step S72). The checksum that has been written is compared with the checksum that has been read from the USB device (step S73). If the checksums are the same (step S73/YES), the USB HC circuit 2 completes rewriting the firmware. If the checksums are different (step S73/NO), it is determined that the firmware writing has been failed, the USB HC circuit 2 copies the firmware stored in another block of the flash ROM onto the boot region so as to restore to the state prior to the firmware rewriting (step S74). The USB HC circuit 2 completes the firmware rewriting.

When the USB HC circuit 2 completes the firmware rewriting, go to step S42 to check whether there is a firmware for the USB device emulation circuit 3 (step S42). If the USB HC circuit 2 finds the firmware provided for the USB device emulation circuit 3 by searching with the firmware file name (step S42/YES), the signature file thereof is read (step S43) to confirm the signature (step S44). If the file is a correct one by confirming with the signature (step S44/YES), the firmware for the USB device emulation circuit 3 is rewritten (step S45).

Figure 21:
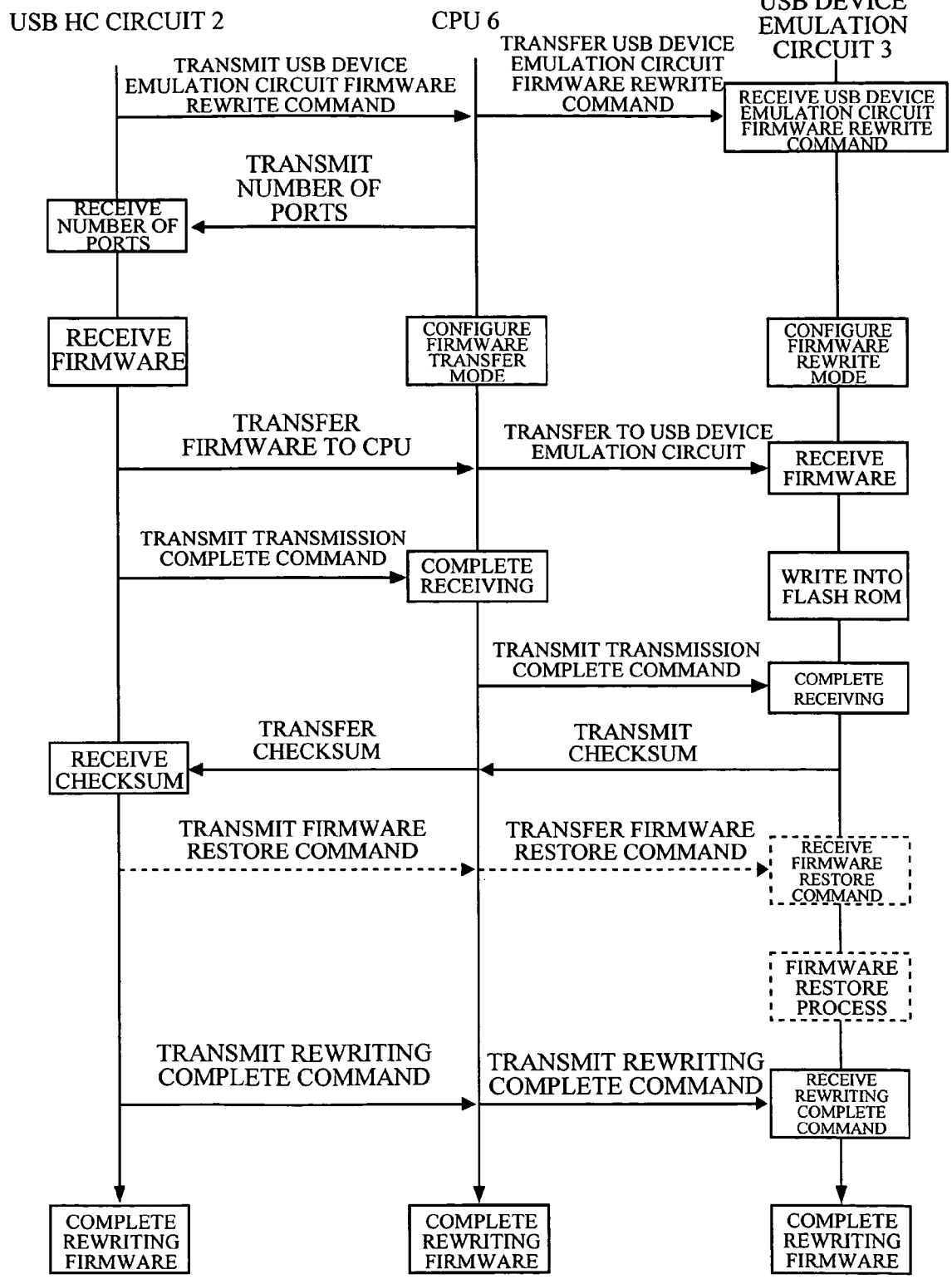
FIG. 21 shows a procedure of rewriting the firmware of a USB device emulation circuit 3.
Figure 22:
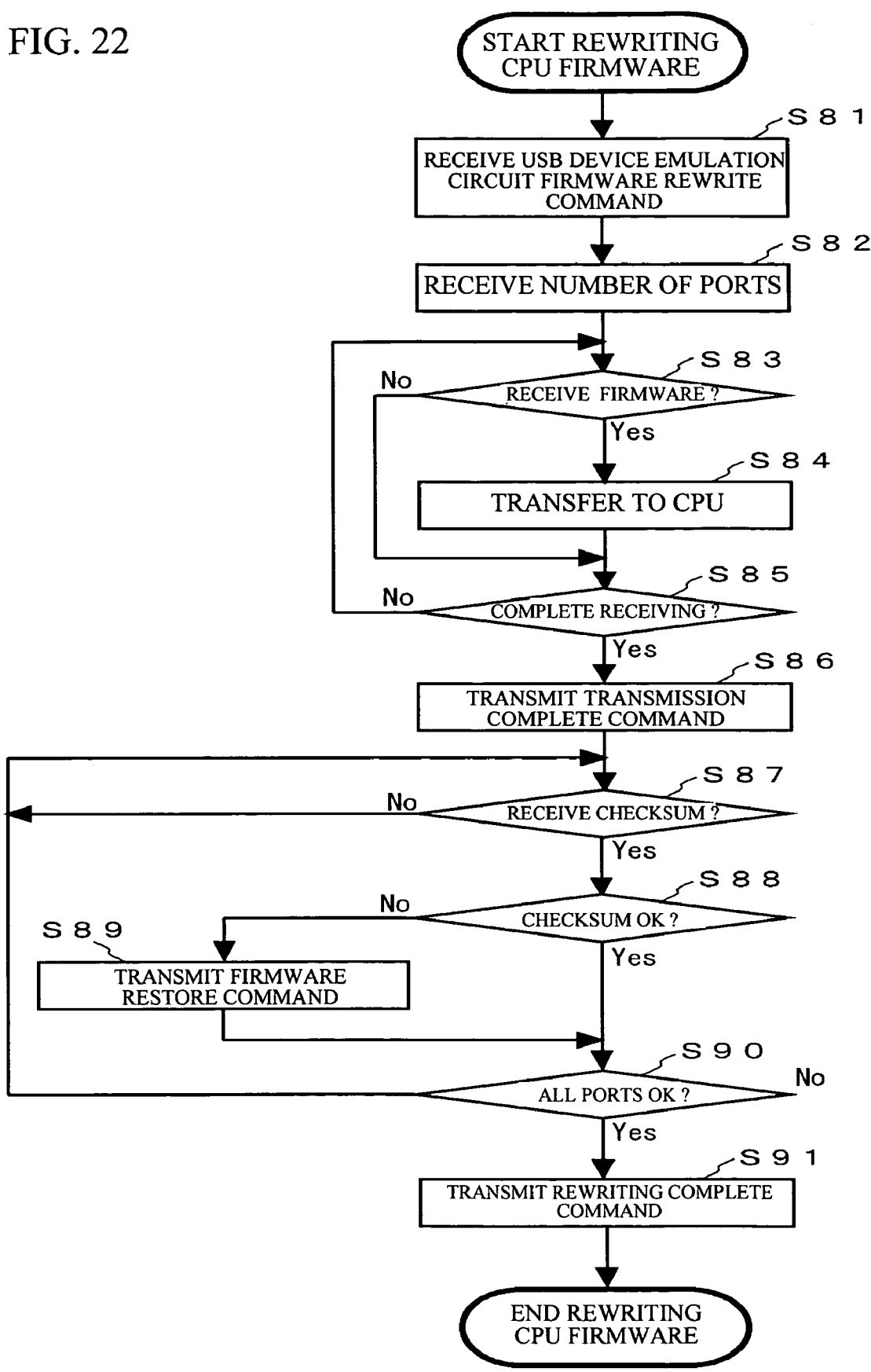
FIG. 22 is a flowchart of a procedure of the USB HC circuit 2 for rewriting the firmware of the USB device emulation circuit 3.

FIG. 21 shows a rewriting sequence of the firmware on the USB device emulation circuit 3. Firstly, the USB HC circuit 2 transmits the firmware rewrite command of the USB device emulation circuit 3 to the CPU 6. The CPU 6 transfers the command to all the USB device emulation circuits 3 coupled to the selector 1. Then, the CPU 6 transmits the number of the ports to the USB HC circuit 2. The USB HC circuit 2 receives the number. The number of the ports will be used for checking whether the confirmation of the checksum is completed on all the ports. The CPU 6 configures the CPU 6 itself in firmware transfer mode. The USB device emulation circuit 3 configures the USB device emulation circuit 3 itself in firmware rewrite mode.

Next, the USB HC circuit 2 reads the firmware file from the USB device and transfers the file to the CPU 6. Upon receiving the firmware, the CPU 6 transfers the firmware to the USB device emulation circuits 3 coupled to all the ports. Each USB device emulation circuit 3 receives the firmware (and stores the firmware on a RAM) and writes the firmware into the flash ROM thereof. The above-mentioned processes are repeated until each USB device emulation circuit 3 completes writing.

The USB HC circuit 2 completes reading the firmware, and transmits a transmission complete command to the CPU 6. Upon receiving the command, the CPU 6 completes receiving the firmware, and transmits the command to the USB device emulation circuits 3 coupled to all the ports. Each USB device emulation circuit 3 receives the command, and transmits the checksum to the CPU 6. The CPU 6 transfers the checksum to the USB HC circuit 2. The CPU 6 transfers the checksum to the USB HC circuit 2 until receiving the checksum from all the ports.

Upon receiving the checksum, the USB HC circuit 2 compares the received checksum with the checksum of the firmware read from the USB device. If the checksums received from all the ports are matched, the USB HC circuit 2 transmits a rewriting complete command to the CPU 6 and completes rewriting the firmware. Upon receiving the rewriting complete command, the CPU 6 transfers the command to the USB device emulation circuit 3, and completes the firmware rewriting. Upon receiving the rewriting complete command, the USB device emulation circuit 3 completes the firmware rewriting.

If the checksums are different, it is determined that the firmware rewriting has been failed and a firmware restore command is transmitted to the CPU 6. Upon receiving the firmware restore command, the CPU 6 transfers the firmware restore command to the USB device emulation circuits 3 coupled to all the ports. Each USB device emulation circuit 3 receives the firmware restore command, and copies the firmware stored in another block of the flash ROM onto the boot area to restore to the state prior to the firmware rewriting. When the firmware rewriting is completed on the USB device emulation circuit 3, go to step S46 shown in FIG. 16 in a reset state of the selector, so as to reset the selector 1. Then, the selector 1 starts operating with the firmware respectively rewritten.

A description will now be given of the operation procedure of the firmware rewriting in each USB device emulation circuit 3 as described above. Firstly, the operation of the USB HC circuit 2 will be described, with reference to FIG. 22. Upon receiving the firmware rewrite command of the USB device emulation circuit 3 (step S81), the USB HC circuit 2 transfers the command to the CPU 6. Next, the USB HC circuit 2 receives the information on the number of the ports transferred from the CPU 6 (step S82). Then, transferring the received firmware (step S83) to the CPU 6 (step S84) is repeated until the firmware is completed receiving (step S85). The firmware receiving is completed (step S85/YES), and a transmission complete command is transmitted to the CPU 6 (step S86).

The USB HC circuit 2 receives the checksum from the CPU 6 (step S87), and compares the checksum with the checksum of the firmware read from the USB device. If the checksums of the all the ports received in step S82 are matched (step S88/YES and step S90/YES), the rewriting complete command is transmitted to the CPU 6 and the firmware rewriting is completed (step S91). If the checksums are different (step S88/NO), the firmware restore command is transmitted to the CPU 6 (step S89).

Figure 23:
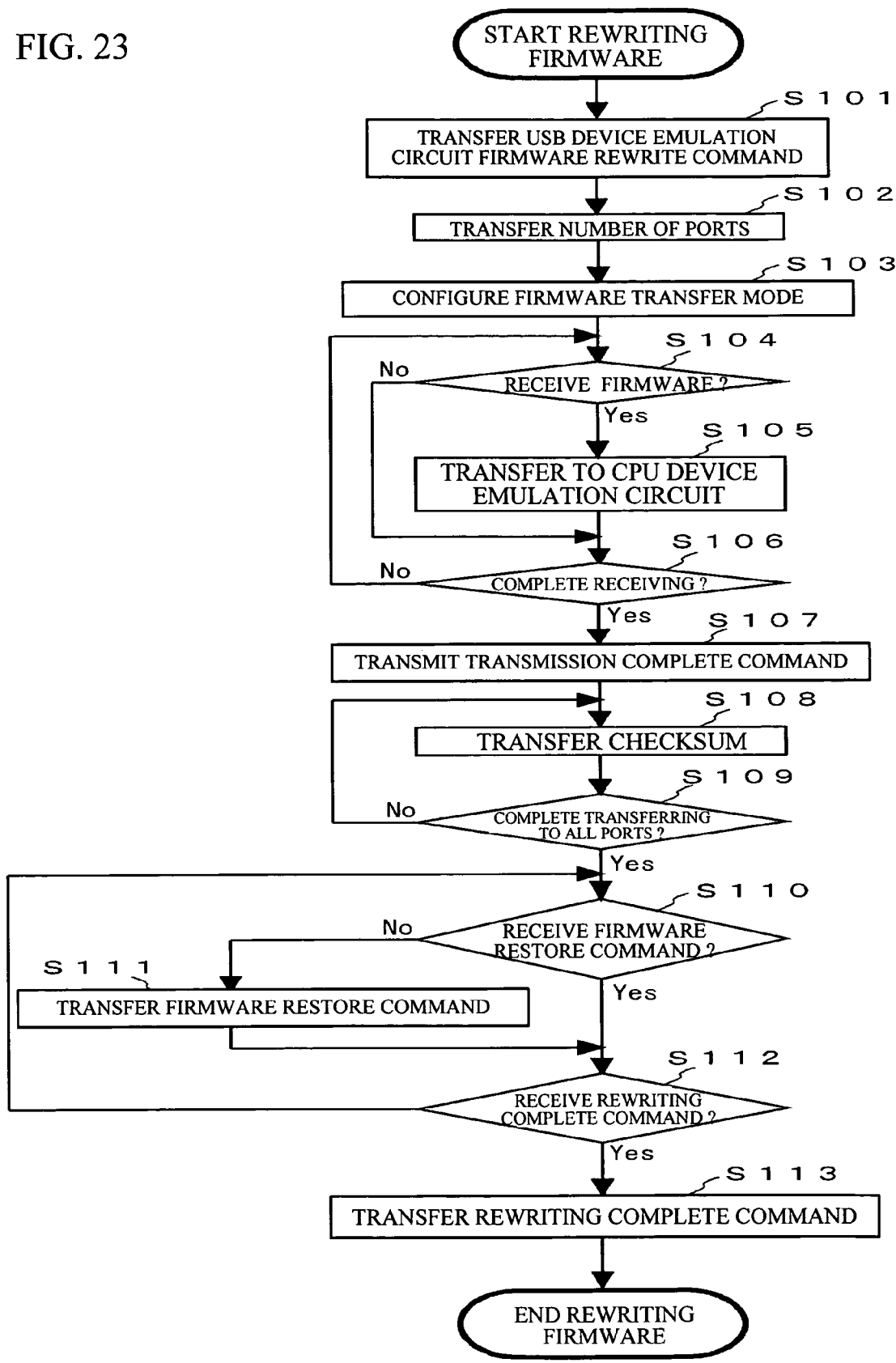
FIG. 23 is a flowchart of a procedure of the CPU 6 for rewriting the firmware of the USB device emulation circuit 3.

Referring now to FIG. 23, a description will be given of a procedure operated by the CPU 6 in rewriting the USB device emulation circuit firmware. The CPU 6 transmits the firmware rewrite command of the USB device emulation circuit firmware transferred from the USB HC circuit 2, to the USB device emulation circuits 3 coupled to all the ports (step S101). Then, the CPU 6 the number of the ports of the selector 1 to the USB HC circuit 2 (step S102), and configures the CPU 6 itself in firmware transfer mode (step S103).

Upon receiving the firmware from the USB HC circuit 2 (step S104/YES), the CPU 6 transfers the firmware to the USB device emulation circuit 3 (step S105). When the firmware is completed receiving (step S106/YES), the transmission complete command is transmitted to the USB device emulation circuit 3 (step S107).

Then, the CPU 6 transfers the checksum transmitted from the USB device emulation circuit 3 to the USB HC circuit 2 (step S108). This is repeated until the checksums are received from all the ports (step S109). The CPU 6 checks whether the firmware restore command has been received from the USB HC circuit 2 (step S110). If the command has been received (step S110/YES), the command is transferred to the USB device emulation circuit 3 (step S111). When the rewriting complete command is received from the USB HC circuit 2 (step S112), the command is transferred to the USB device emulation circuit 3 (step S113) and the process is completed.

Figure 24:
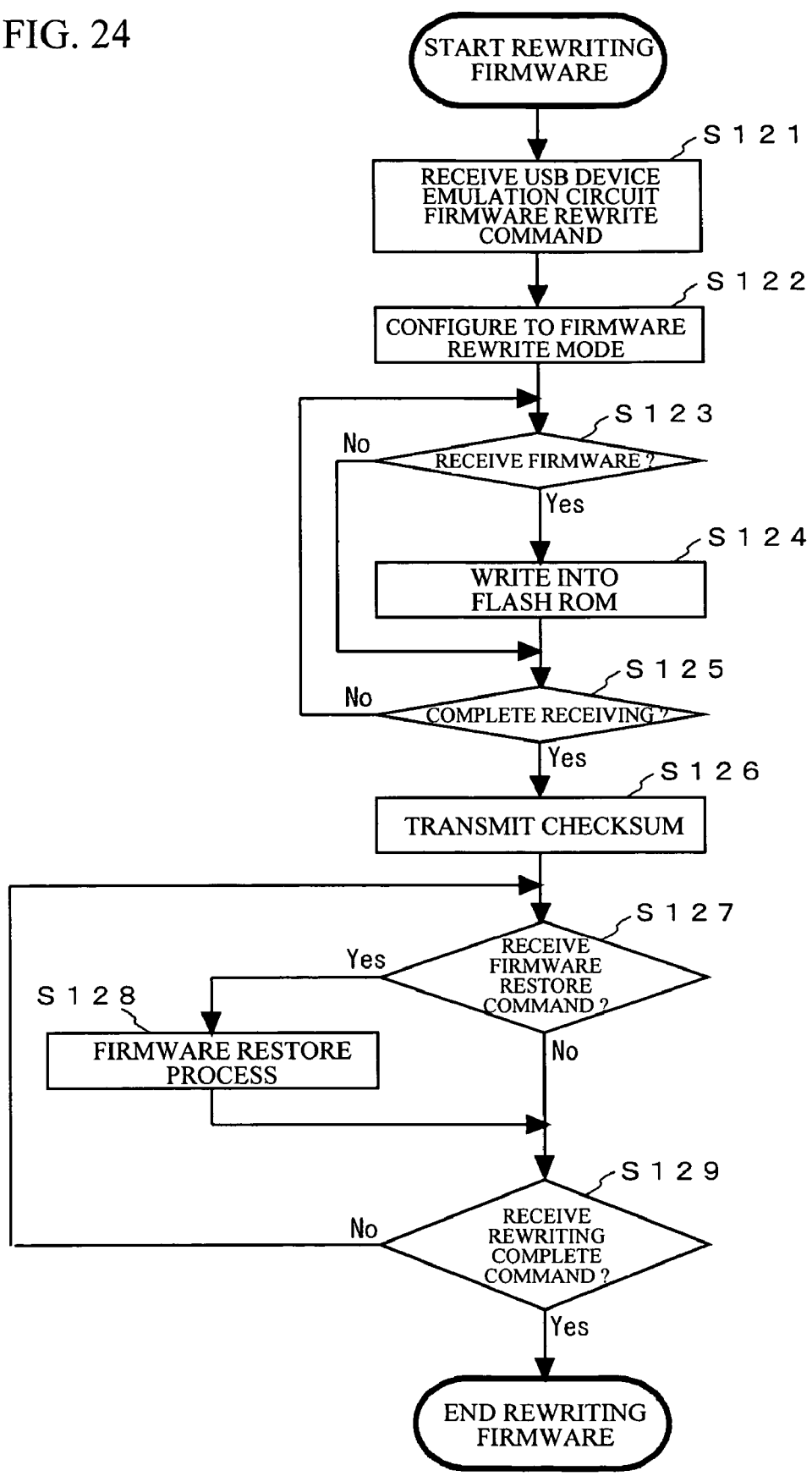
FIG. 24 is a flowchart of a procedure of the USB device emulation circuit 3 for rewriting the firmware of the USB device emulation circuit 3.

Referring to FIG. 24, a description will be given of the procedure of firmware rewriting on the USB device emulation circuit 3. Upon receiving the firmware rewrite command from the CPU 6 (step S121), the USB device emulation circuit 3 configures the USB device emulation circuit 3 itself in firmware rewrite mode (step S122). Then, the firmware received from the CPU 6 (step S123) is written into the flash ROM of the USB device emulation circuit 3 (step S124). When the USB device emulation circuit 3 receives the transmission complete command from the CPU 6 and completes receiving (step S125), the USB device emulation circuit 3 transmits the checksum to the CPU 6 (step S126).

When the USB device emulation circuit 3 receives the firmware restore command relative to the transmitted checksum (step S127), the USB device emulation circuit 3 implements the firmware restore process (step S128). When the USB device emulation circuit 3 receives the rewriting complete command (step S129), the USB device emulation circuit 3 completes rewriting the firmware.

In the above-mentioned method, the selector 1 is capable of implementing the processes for new capabilities of newly attached USB keyboard 31 and the USB mouse 32 and extending the capabilities of the selector 1 itself. Accordingly, the firmware can be installed automatically by simply attaching the USB device that stores the firmware.

The present invention is not limited to the above-mentioned embodiments, and other embodiments, variations and modifications may be made without departing from the scope of the present invention.

The present invention is based on Japanese Patent Application No. 2004-316319 filed on Oct. 29, 2004, the entire disclosure of which is hereby incorporated by reference.

What is claimed is:

1. A selector that selectively makes connections between USB devices attached to a console side thereof and electronics devices connected to a host side thereof, the selector comprising:
a USB host circuit controlling the USB devices; and
USB device emulation circuits being respectively provided for the electronics devices and maintaining the connections with the electronics devices even while the USB devices are selectively being changed; and
a control circuit coupling the USB host circuit and USB device emulation circuits,
wherein the USB host circuit solely implements a process relating to attaching and detaching the USB devices.

2. The selector as claimed in claim 1, wherein:
the control circuit changes a destination of signals output from the USB devices to one of the USB device emulation circuits coupled to a selected port of the selector when the electronic devices are changed; and
the USB host circuit maintains the connections with the USB devices even while the control circuit is implementing a process for selectively changing the electronics devices.

3. The selector as claimed in claim 1, further comprising a reset switch resetting the USB host circuit and the control circuit at different timings.

4. The selector as claimed in claim 1, wherein the USB host circuit converts data received from the USB devices into PS/2 format and transmits converted data to the control circuit.

5. The selector as claimed in claim 1, wherein the USB host circuit converts data received from the USB device into serial data and transmits the serial data to the control circuit.

6. The selector as claimed in claim 1, wherein the USB device emulation circuit implements an enumeration process on multiple USB keyboards and multiple USB mouses so that the electronics devices may view the multiple USB keyboards and the multiple USB mouses as a set of USB keyboard and USB mouse.

7. The selector as claimed in claim 6, wherein the USB host circuit merges data received from said multiple USB devices and transmits merged data to the control circuit.

8. The selector as claimed in claim 1, wherein the USB device emulation circuit implements an enumeration process on multiple USB keyboards and multiple USB mouses coupled to the selector via a USB hub, so that the electronics devices may view the multiple USB keyboards and the multiple USB mouses as a set of USB keyboard and USB mouse.

9. The selector as claimed in claim 1, wherein the USB device emulation circuit acquires descriptors from the USB devices being coupled, and rewrites descriptors of the USB device emulation circuit with the descriptors received, so that the electronics devices may learn the descriptors of the USB devices.

10. The selector as claimed in claim 9, wherein the selector includes multiple USB device emulation circuits so that multiple arbitrary USB devices having specific functions can be emulated.

11. The selector as claimed in claim 9, wherein the selector includes multiple USB device emulation circuits having control transfer functions so that multiple arbitrary USB devices can be emulated.

12. The selector as claimed in claim 1, further comprising an input/output port for another interface other than USB to attach an input device having said another interface and the USB devices to the selector simultaneously.

13. The selector as claimed in claim 12, wherein the USB host circuit detects the connections of the USB devices and disables the input device having said another interface.

14. The selector as claimed in claim 12, wherein the control circuit disables the input device having said another interface by software, when the USB host circuit detects the connections of the USB devices.

15. The selector as claimed in claim 1, wherein the USB host circuit checks whether a firmware of the selector is stored in the USB devices when the USB devices are attached, and rewrites the firmware if the firmware is detected.

16. The selector as claimed in claim 15, wherein the USB host circuit updates multiple firmwares simultaneously.

17. The selector as claimed in claim 1, further comprising LEDs indicating status of the USB devices.

18. The selector as claimed in claim 1, further comprising an OSO (On Screen Display) circuit displaying status of the USB devices.

19. A method of selectively changes USB devices attached to a console side of a selector and changing electronics devices connected to a host side of the selector, a USB host circuit controlling the USB devices, the method comprising:
providing USB device emulation circuits respectively for the electronic devices;
controlling the USB devices using the USB host circuit;
maintaining the connections of the USB device emulation circuits with the electronics devices even while the USB devices are selectively being changed; and
coupling the USB host circuit and USB device emulation circuits, wherein the USB host circuit solely implements a process relating to attching and detaching the USB devices.

20. A selector that selectively makes connections between USB devices attached to a console side thereof and electronics devices connected to a host side thereof, the selector comprising:
a USB host circuit controlling the USB devices; and
USB device emulation circuits being respectively provided for the electronics devices and maintaining the connections with the electronics devices even while the USB devices are selectively being changed; and
a control circuit coupling the USB host circuit and USB device emulation circuits,
wherein the USB host circuit solely implements a process relating to over-current in the USB devices.

21. A selector that selectively makes connections between USB devices attached to a console side thereof and electronics devices connected to a host side thereof, the selector comprising:
a USB host circuit controller the USB devices; and
USB device emulation circuits being respectively provided for the electronics devices and maintaining the connections with the electronics devices even while the USB devices are selectively being changed; and
a control circuit coupling the USB host circuit and USB device emulation circuits,
wherein the USB host circuit solely implements a process relating to error in the USB devices.

22. A selector that selectively makes connections between USB devices attached to a console side thereof and electronics devices connected to a host side thereof, the selector comprising:
- a USB host circuit controlling the USB devices;
- USB device emulation circuits respectively provided for the electronics devices and maintaining the connections with the electronics devices even while the USB devices are selectively being changed; and
- a control circuit coupling the USB host circuit and USB device emulation circuits, wherein:
- the control circuit shifts to a select control mode when a first key is input, and the electronics devices to be coupled being selectively changed when a second key is input either on a USB keyboard or by a USB mouse,
- the control circuit transmits a selector connection check command after shifting to the select control mode, and
- the USB emulation circuit checks a given signal transmitted from a port of the selector, recognizes that multiple selectors are in cascade connection, and notifies the control circuit of the cascade connection.

* * * * *

UNITED STATES PATENT AND TRADEMARK OFFICE
CERTIFICATE OF CORRECTION

| | |
|---|---|
| PATENT NO. | : 7,433,991 B2 |
| APPLICATION NO. | : 11/260294 |
| DATED | : October 7, 2008 |
| INVENTOR(S) | : Kenichi Fujita et al. |

It is certified that error appears in the above-identified patent and that said Letters Patent is hereby corrected as shown below:

Column 18, Line 25, change "OSO" to --OSD--.

Column 18, Line 27, change "changes" to --changing--.

Column 18, Line 39, change "attching" to --attaching--.

Signed and Sealed this

Twenty-seventh Day of January, 2009

JOHN DOLL
*Acting Director of the United States Patent and Trademark Office*